United States Patent
Golshany et al.

(10) Patent No.: US 9,828,084 B2
(45) Date of Patent: Nov. 28, 2017

(54) VIBRATION DAMPENING FOR HORIZONTAL STABILIZERS

(71) Applicant: The Boeing Company, Chicago, IL (US)

(72) Inventors: Sina Sam Golshany, Lynwood, WA (US); Todd W. Erickson, Fife, WA (US); Paul R. Tretow, Mukilteo, WA (US); David M. Huntly, Seattle, WA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 14/705,863

(22) Filed: May 6, 2015

(65) Prior Publication Data

US 2016/0325821 A1    Nov. 10, 2016

(51) Int. Cl.
*B64C 3/38* (2006.01)
*B64C 5/02* (2006.01)
(Continued)

(52) U.S. Cl.
CPC .............. *B64C 5/02* (2013.01); *B64C 1/26* (2013.01); *F16F 15/002* (2013.01);
(Continued)

(58) Field of Classification Search
CPC ........... B64C 3/56; B64C 39/024; B64C 3/40; B64C 3/385; B64C 29/0033; B64C 2201/102; B64C 3/38; B64C 39/12; B64C 3/54; B64C 1/26; B64C 23/065; B64C 37/00; B64C 2201/021; B64C 39/068; B64C 2201/165; B64C 23/00; B64C 23/005; B64C 23/04; B64C 25/32; B64C 25/56; B64C 25/66; B64C 2700/6281; B64C 27/001; B64C 27/12; B64C 27/46;
(Continued)

(56) References Cited

U.S. PATENT DOCUMENTS 1,771,257 A * 7/1930 Ingram ................... B64C 3/385
                                                        244/232
RE18,181 E * 9/1931 Stelzer .................... B64C 3/385
                                                         244/38
(Continued)

FOREIGN PATENT DOCUMENTS

WO    WO 2008/001336    1/2008

OTHER PUBLICATIONS

Extended European Search Report dated Sep. 28, 2016 from EP Application Serial No. 16168593.8, 8 pages.

*Primary Examiner* — Steven Marsh
(74) *Attorney, Agent, or Firm* — Miller, Matthias & Hull LLP

(57) ABSTRACT

Systems and methods provide for the mitigation of vibrational forces acting on a horizontal stabilizer of an aircraft. According to one aspect, a damper is coupled to a front portion of a horizontal stabilizer to dampen vibrations in a first degree of freedom, with another damper coupled to a mounting point of the horizontal stabilizer to dampen vibrations in a second degree of freedom. The dampers may be passive, operating independently to mitigate vibrational forces, or active, applying a mitigating force to the horizontal stabilizer based on real-time or estimated vibration states.

40 Claims, 16 Drawing Sheets

(51) Int. Cl.
    *B64C 1/26*     (2006.01)
    *F16F 15/00*     (2006.01)
    *F16F 15/02*     (2006.01)

(52) U.S. Cl.
    CPC ...... *F16F 15/022* (2013.01); *F16F 2228/066* (2013.01); *F16F 2230/18* (2013.01)

(58) Field of Classification Search
    CPC ... B64C 27/50; B64C 27/615; B64C 29/0016; B64C 33/02; B64C 35/00
    USPC ............. 248/560, 562, 637, 638; 244/46, 48
    See application file for complete search history.

(56) References Cited

U.S. PATENT DOCUMENTS

| | | | | |
|---|---|---|---|---|
| 3,721,404 | A * | 3/1973 | Albert | ................ B64C 27/32 |
| | | | | 244/17.19 |
| 3,977,630 | A * | 8/1976 | Lewis | .................. B64C 9/20 |
| | | | | 244/216 |
| 4,365,774 | A * | 12/1982 | Coronel | .................. B64C 3/54 |
| | | | | 244/216 |
| 5,203,524 | A | 4/1993 | Laceby et al. | |
| 5,280,863 | A * | 1/1994 | Schmittle | ............... B64C 3/385 |
| | | | | 244/46 |
| 8,291,782 | B1 | 10/2012 | Shaheen et al. | |
| 2011/0048147 | A1 | 3/2011 | Keech et al. | |
| 2013/0327887 | A1 | 12/2013 | Dyckrup | |

* cited by examiner

VIBRATION DAMPENING FOR HORIZONTAL STABILIZERS

BACKGROUND

Horizontal stabilizers of aircraft are often subjected to turbulent airflow and flight characteristics that induce vibrations throughout the horizontal stabilizers. These vibrations are currently absorbed and distributed throughout the horizontal stabilizer and airframe to which the stabilizer is attached with no or little negative impact. As aircraft manufacturers strive to produce more fuel-efficient aircraft, the use of fuel-efficient engines, such as high bypass ducted fans, will increase. Due to the typical orientation of a high bypass ducted fan engine, the turbulent discharge air (jet-wash) from the engine commonly flows on and over the horizontal stabilizer. As the sizes of high bypass ducted fan engines increase, the quantity of jet-wash will similarly increase. The impact of the resulting increase in vibrational forces caused by the additional jet-wash on the horizontal stabilizer will also increase. In some cases, the increased quantity of jet-wash may be sufficient to induce measurable vibrations in the horizontal stabilizer that are transferred to the fuselage and ultimately felt by the passengers and crew. Long-term effects of the vibrations may include fatigue in the aircraft structure, which may reduce the lifespan of the aircraft or increase maintenance costs.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for the mitigation of vibrations in a horizontal stabilizer of an aircraft. According to one aspect, a vibration dampening system for a horizontal stabilizer includes at least two dampers. A first damper is coupled to a front portion of the horizontal stabilizer and is configured to dampen a vibrational force in a first degree of freedom. A second damper is coupled to the horizontal stabilizer proximate to a mounting point of the stabilizer. The second damper is configured to dampen the vibrational force in a second degree of freedom.

According to another aspect, a method for mitigating vibration in a horizontal stabilizer of an aircraft is provided. According to the method, a vibration is received at a first damper that is coupled to a front portion of the horizontal stabilizer and at a second damper coupled to the stabilizer at a pivot point. The vibration is dampened in a first degree of freedom with the first damper, and is dampened in a second degree of freedom with the second damper.

According to yet another aspect, a vibration dampening system for a horizontal stabilizer of an aircraft is provided. The vibration dampening system includes at least three visco-elastic dampers. The first damper is coupled to a front portion of the horizontal stabilizer and is configured to dampen a vibrational force in a first degree of freedom. The second and third dampers are coupled to the horizontal stabilizer at two pivot points, both of which pivot the stabilizer around a pitch axis of the horizontal stabilizer, and are both configured to dampen the vibrational force in a second degree of freedom.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
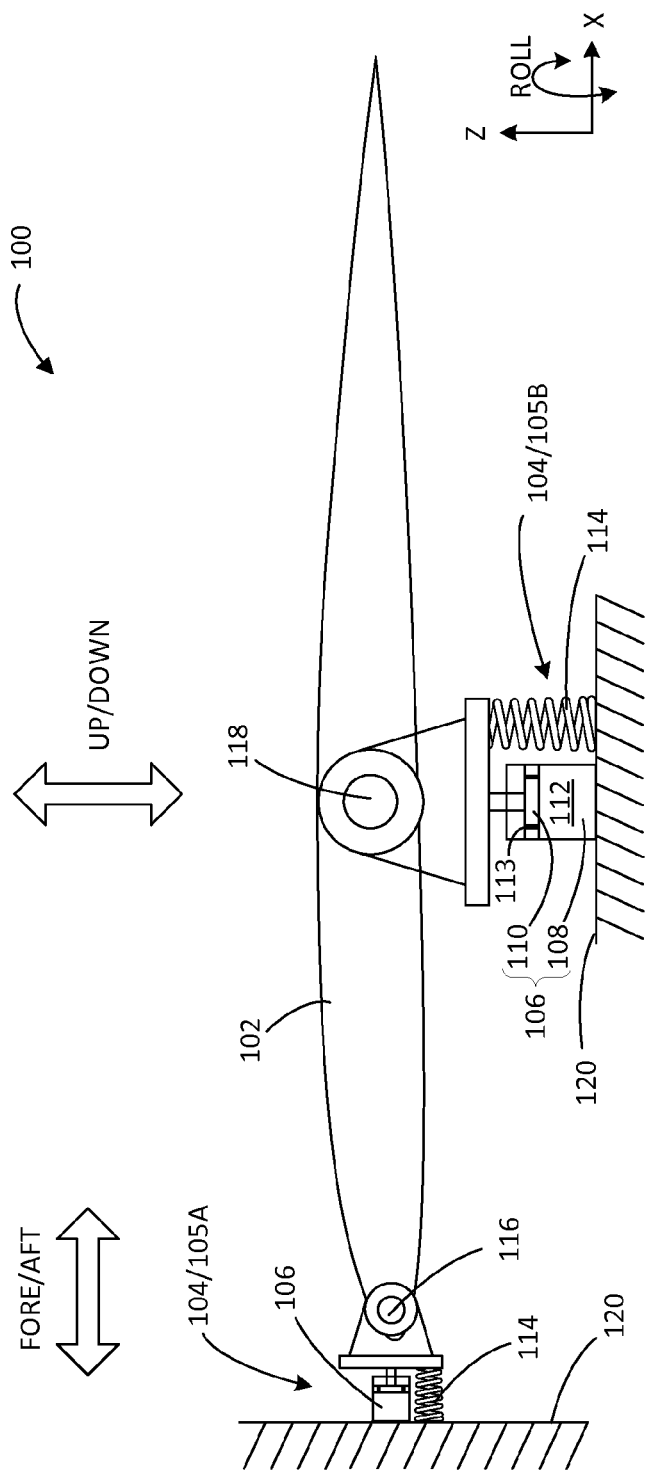
FIG. 1 is a side view of a vibration dampening system having a plurality of passive dampers according to various embodiments described herein.

The following detailed description is directed to a vibration mitigation system and corresponding method that utilizes dampers to mitigate vibrations associated with a horizontal stabilizer of an aircraft. As discussed above, increasing aircraft fuel efficiency is a substantial concern for aircraft and engine manufacturers and corresponding customers. High bypass ducted fan engines, for example, have proven to offer increased efficiency, however, as the size of these engines increases, the corresponding distortion or turbulence associated with the prop wash may create undesirable vibrational forces on the horizontal stabilizer of an aircraft. These vibrations may translate to the airframe, potentially creating excessive noise as well as structural fatigue.

Utilizing the concepts and technologies described herein, a vibration dampening system utilizes a number of dampers to absorb and mitigate vibrational forces in multiple directions. Dampers may be coupled to a horizontal stabilizer of an aircraft at a mounting point, such as a mid-box attachment point or a pivot point, to mitigate vibrations in a first degree of freedom, or z-direction, while one or more dampers coupled to a front portion of the horizontal stabilizer mitigate vibrations in a second degree of freedom, or x-direction. The dampers may be passive, such as visco-elastic dampers, which optimally operate to target mitigation of vibrational forces having a particular frequency. The number, type, or characteristics of the dampers may be selected or designed to mitigate vibrations in at least one frequency or at multiple frequencies. The dampers may additionally or alternatively be active dampers, utilizing linear actuators to induce a force in a desired direction at a desired frequency or frequencies to mitigate corresponding vibrations. According to alternative embodiments, the active dampers may operate via altering a pressure of a fluid within a fluid chamber of a visco-elastic damper rather than utilizing a linear actuator. The induced motion created by the active dampers may be based on an actual real-time vibration state of the horizontal stabilizer as measured by one or more sensors or accelerometers, based on an estimated vibration state as predicted according to one or more aircraft parameters, or a combination thereof.

In the following detailed description, references are made to the accompanying drawings that form a part hereof, and which are shown by way of illustration, specific embodiments, or examples. Referring now to the drawings, in which like numerals represent like elements through the several figures, a vibration mitigation system and method for employing the same according to the various embodiments will be described.

FIG. 1 shows a side view of a vibration mitigation system 100 for mitigating vibrations associated with the horizontal stabilizer 102 of an aircraft. Looking at FIG. 1, a vibration dampening system 100 includes dampers 104. According to this embodiment, the dampers 104 include two passive dampers, passive damper 105A and passive damper 105B (collectively referred to as "passive dampers 105"). Although only two dampers 104 are shown in this view, additional dampers 104 may be used. In this example, each passive damper 105A and 105B is a visco-elastic damper, having a viscous damper 106 and an elastic element such as a spring 114. The viscous damper 106 includes a viscous fluid chamber 108 (double acting) and a damper piston 110 having a number of orifices 113. The damper piston 110 exerts a force on a viscous fluid 112 within the viscous fluid chamber 108. Because the viscous fluid 112 is substantially incompressible, when a downward force is applied by the damper piston 110, the viscous fluid 112 is pressed through a number of orifices 113 in the damper piston 110. The characteristics of the viscous fluid 112 and of the orifices 113 determine the dampening characteristics of the viscous damper 106, which can be quantified by a damping coefficient (c), which is described in greater detail below. The spring 114 is compressed with the downward force applied to the damper piston 110, further mitigating the downward force, while providing a return force that moves the damper piston 110 upward toward a starting position after downward motion is stopped.

The opposite process is also true. When an upward force is applied to the damper piston 110, the viscous fluid 112 in a top portion of the viscous fluid chamber 108 is pressed through the orifices 113, slowing the piston movement and mitigating the upward force. The spring 114 is stretched to create a tension force that acts to mitigate the upward force while providing a return force that moves the damper downward after upward movement is stopped. It should be appreciated that the number of viscous dampers 106 within a passive damper 105 may be smaller, greater, or equal to the number of elastic elements, or springs 114. Throughout this disclosure, the elastic element will be referred to as a spring 114, however, any suitable elastic element may be utilized without departing from the scope of this disclosure. For example, the elastic element may include, but not be limited to, any conventional type of spring, compressed gaseous spring, or passive electric linear actuator that is permanently exerting a predetermined force. It should also be appreciated that although the various embodiments with respect to passive dampers 105 are described as having viscous dampers 106 utilizing viscous fluid 112, the present disclosure may alternatively be implemented using hydro-pneumatic dampers or other dampers utilizing compressible fluids.

The forces applied to the damper piston 110 originate from vibration forces in the horizontal stabilizer 102 since the passive dampers 104 are coupled to the horizontal stabilizer 102. According to one embodiment, the vibration mitigation system 100 includes a passive damper 105A that is coupled to a front portion 116 of the horizontal stabilizer 102 and at least one passive damper 105B coupled to the horizontal stabilizer 102 at a pivot point 118. For the purposes of this disclosure, "front portion" may include any portion of the horizontal stabilizer 102 forward of the pivot points 118 and corresponding pivot axis around which the horizontal stabilizer 102 rotates for trimming purposes. For example, according to some embodiments, the front portion 116 may be on or proximate the leading edge of the horizontal stabilizer 102, while according to other embodiments, the front portion 116 may include a front horizontal stabilizer spar, which could be positioned between the leading edge and the pivot points 118. In some implementations, the front portion may be near or proximate to the pivot points 118. Although only one passive damper 105B is shown at the pivot point 118 in the side view of FIG. 1, according to the examples described and shown throughout the drawings, there may be two passive dampers 105 positioned at pivot points around a pivot axis. This configuration is best shown and further described below with respect to FIG. 3. It should be understood that the disclosure herein is not limited to any particular number of dampers.

It is common for horizontal stabilizers 102 of commercial aircraft to pivot around a pivot axis in order to trim the aircraft pitch to accommodate different center of gravity positions of the aircraft during different phases of flight. To provide for this pivoting capability, the horizontal stabilizer 102 of an aircraft is typically mounted to the fuselage or vertical stabilizer (depending on tail configuration) via pivot points, while controlling the pitch using a jack screw or suitable actuator coupled to the front portion 116 of the horizontal stabilizer 102. By raising and lowering the jack screw, the front portion 116 of the horizontal stabilizer 102 is raised and lowered, pivoting the entire horizontal stabilizer 102 around the pivot axis intersecting the pivot points to which the horizontal stabilizer 102 is mounted. For the purpose of this disclosure, the vibration mitigation system 100 may be shown and described as being mounted to a structure 120. While not specifically shown in FIG. 1 (best seen in FIG. 3 and discussed below), the structure 120 may be spars within the vertical stabilizer and the horizontal stabilizer 102.

According to various embodiments, the passive damper 105A that is coupled to the front portion 116 of the horizontal stabilizer 102 is configured to dampen vibrational forces in a first degree of freedom, while the passive damper 105B coupled to the horizontal stabilizer 102 at the pivot point 118 is configured to dampen vibrational forces in a second degree of freedom. More specifically, as seen in FIG. 1, the vibrational forces being mitigated in the first degree of freedom by the passive damper 105A may be oriented in a fore-aft direction substantially parallel to the x-axis or longitudinal axis of the aircraft. The vibrational forces being mitigated in the second degree of freedom by the passive damper 105B may be oriented in an up-down direction substantially parallel to the z-axis, or substantially normal to the longitudinal axis of the aircraft. It should be noted that the dampers 104 additionally operate to dampen vibrational forces in a third degree of freedom, which is around a roll axis, as indicated by the roll label around the x-axis indicator in FIG. 1. The roll dampening exists in situations where the horizontal stabilizer 102 on opposing sides of the vertical stabilizer (shown in FIGS. 2 and 3) are subjected to different vibrational forces. The different vibrations may occur due to engine thrust asymmetry, yaw, or asymmetric wind gusts. By mitigating these vibrational forces on the horizontal stabilizer 102 on both sides of the vertical stabilizer, roll-inducing forces may be mitigated.

While the dampers 104 are shown throughout the figures as being oriented substantially parallel with the x-axis and z-axis, it should be understood that any one or more of the dampers 104 described and shown with respect to any of the various embodiments disclosed herein may be oriented at an angle with respect to the x or z axis. For example, if primary vibrational forces were determined to be transferred to the structure 120 at a particular angle with respect to the x-axis through the front portion 116 of the horizontal stabilizer 102, the passive damper 105A may be oriented at a corresponding angle that allows the vibrational forces to be absorbed substantially linearly along the direction of travel of the damper piston 110 and spring 114.

Figure 2:
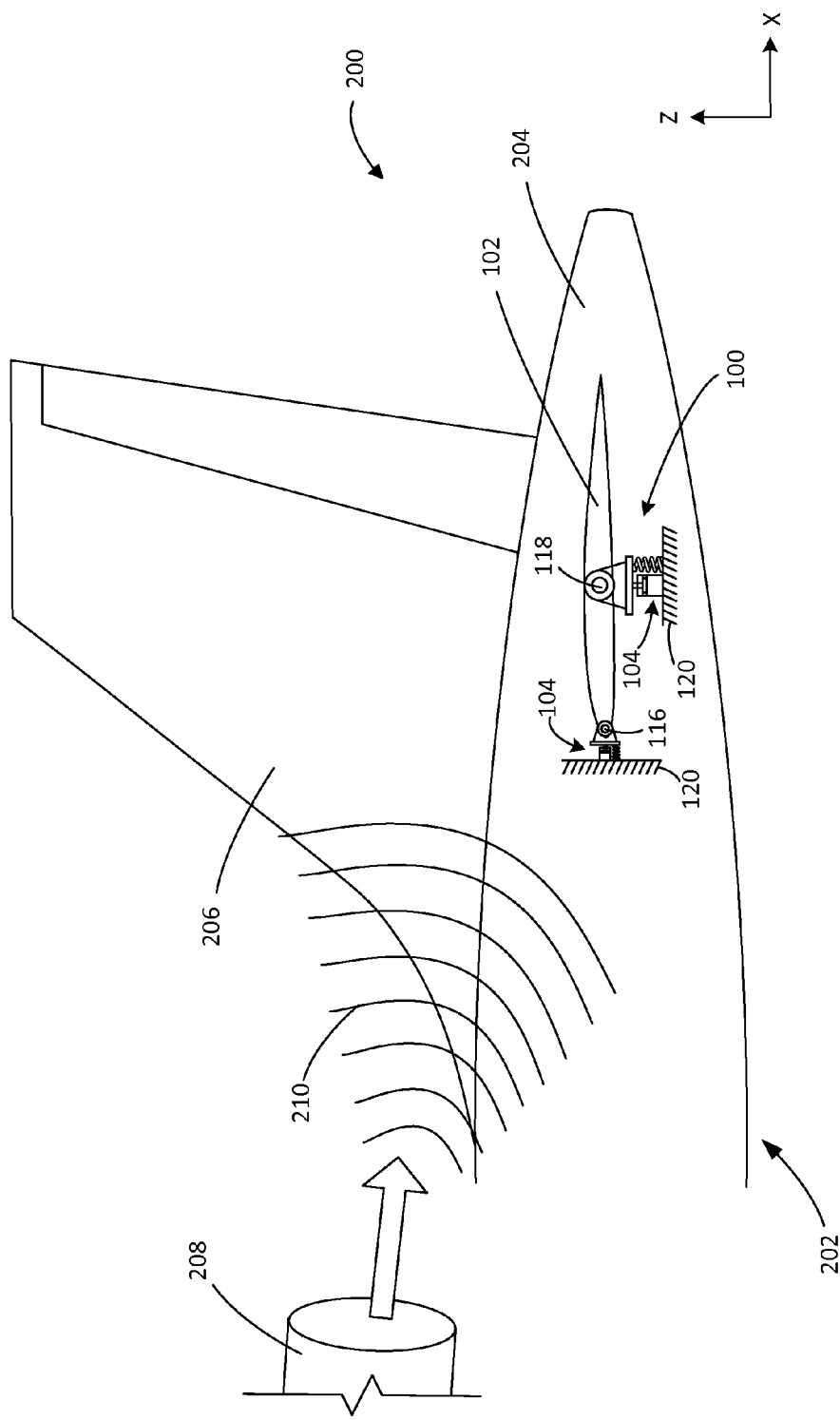
FIG. 2 is a side view of a vibration dampening system installed in an aircraft having a low-tail configuration according to various embodiments described herein.

FIG. 2 shows a side view of a vibration dampening system 100 installed in an aircraft 202 having a low-tail configuration 200. The low-tail configuration is a conventional configuration in which the horizontal stabilizer 102 is mounted within an aft portion of the fuselage 204 with the vertical stabilizer 206 extending upwards from the fuselage 204 above the horizontal stabilizer 102. For various well-known reasons, a conventional low-tail configuration 200 is desirable over other alternative configurations, several of which are discussed below. However, the low positioning of the horizontal stabilizer 102 exposes the horizontal stabilizer 102 to distortion from the exit airflow 210 from one or more engines 208. Although the engines 208 may be of any type and quantity, as discussed above, the engines 208 may be high bypass ducted fan engines that produce a significant amount of exit airflow 210 distortion. Other examples of engines 208 include, but are not limited to, propeller driven systems, turbofan systems, turbo-propeller systems, electric drive propulsion systems, hybrid electric systems, and open-rotor propulsion systems.

The aerodynamic lift loads associated with a horizontal stabilizer 102 are generally transferred to the fuselage 204 through the pivot points 118 of the horizontal stabilizer 102, so the dampers 104 positioned at the pivot points 118 will target the frequency by which the lift force will be varying due to the vibrational forces associated with the exit airflow 210. The exit airflow 210 distortion varies the drag forces associated with the horizontal stabilizer 102, which are primarily transferred to the fuselage 204 via the jack screw coupled to the front portion 116 of the horizontal stabilizer 102, which is used to rotate the horizontal stabilizer 102 around the pivot points 118 for trimming purposes. Accordingly, the damper 104 positioned at the front portion 116 of the horizontal stabilizer 102 will target the frequency by which the drag forces will vary due to the vibrational forces associated with the nature of the distortion induced in the exit airflow 210. Additionally, any pitching moments induced around the pivot points 118 of the horizontal stabilizer 102 will be substantially transmitted to the jack screw at the front portion 116 of the horizontal stabilizer 102. Any varying forces associated with changes to the pitching moment may also be mitigated by the damper 104 positioned at the front portion 116 of the horizontal stabilizer 102 according to various embodiments described herein.

The frequencies targeted by the dampers 104 at each location may vary depending on the flight characteristics or phase of flight of the aircraft 202. For example, the exit airflow, as well as ambient airflow, over the horizontal stabilizer 102 may differ during the climb phase, cruise phase, and descent phase of any given flight. According to various embodiments, the vibration dampening system 100 may be tuned to mitigate undesirable vibrational forces during a particular phase of flight. For example, due to the disproportionate length of time that the aircraft 202 may spend in cruise flight compared to other phases of flight, the dampers 104 may be designed or selected according to vibration frequencies most likely encountered during cruise flight characteristics. As will be discussed below, a number of design considerations are utilized in tuning or adapting the vibration dampening system 100 to the particular aircraft 202 for maximum dampening effect.

Figure 3:
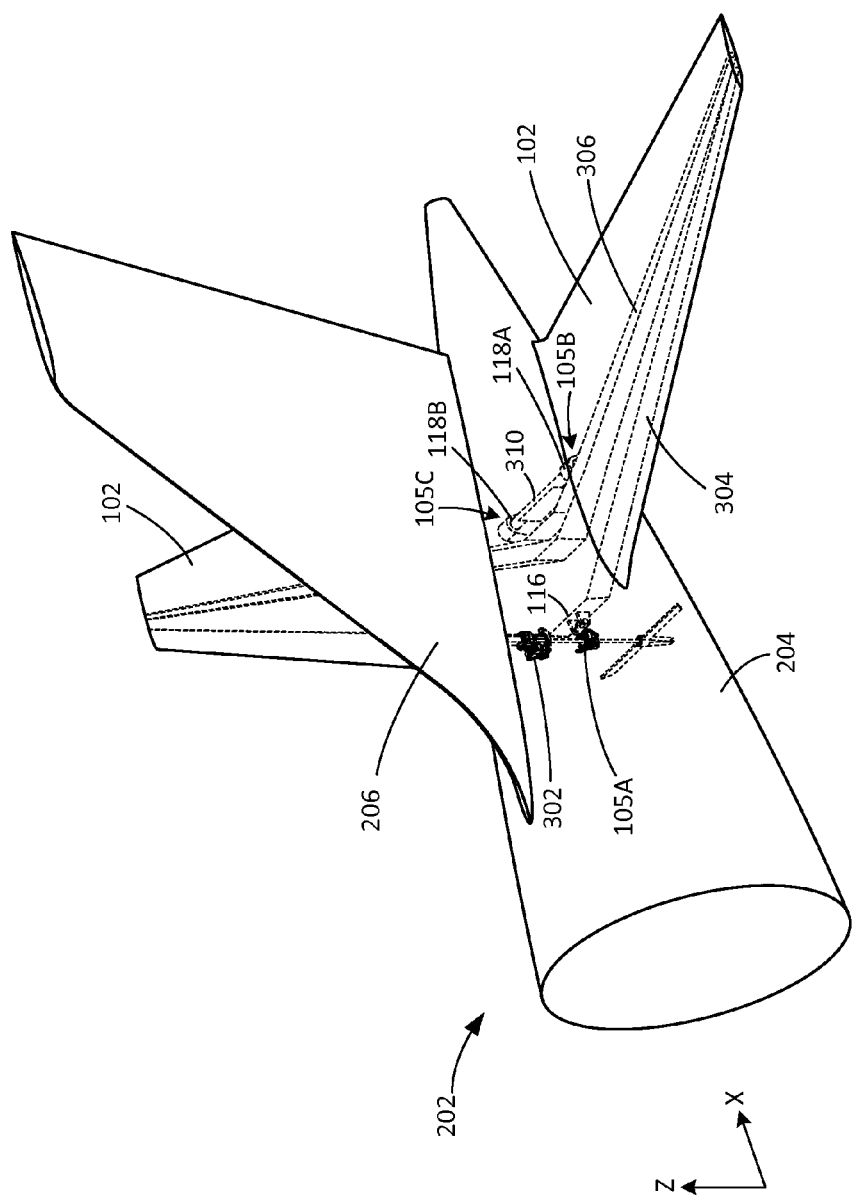
FIG. 3 is a perspective view of a vibration dampening system installed in an aircraft having a low-tail configuration according to various embodiments described herein.

As previously suggested, the structure 120 to which the dampers 104 are mounted may include structural components of the fuselage 204, including a jack screw commonly used at the front portion 116 of the horizontal stabilizer 102 for trimming purposes. Turning now to FIG. 3, further detail with respect to the vibration dampening system 100 and the structure 120 to which it is attached will be described according to various embodiments. FIG. 3 is a perspective view of a vibration dampening system 100 installed in an aircraft 202 having a low-tail configuration 200. With this perspective view, it can be seen that up and down movement of the jack screw 302 moves the front portion 116 of the horizontal stabilizer 102 up and down, which pivots the horizontal stabilizer 102 around the pivot axis 310 intersecting the pivot points 118A and 118B.

The vibration dampening system 100 of this embodiment includes three dampers 104. Specifically, passive damper 105A is coupled to the jack screw 302 at the front portion 116 of the horizontal stabilizer 102 and is configured to dampen vibrational forces in the first degree of freedom substantially parallel to the x-axis, or fore and aft. The front portion 116 of this example includes a horizontal stabilizer front spar 304 such that the jack screw 302 is coupled to the horizontal stabilizer front spar 304 via the passive damper 105A. The passive dampers 105B and 105C are coupled to the pivot points 118A and 118B, respectively, at a horizontal stabilizer rear spar 306 and are configured to dampen vibrational forces in the second degree of freedom substantially parallel to the z-axis, or up and down.

Figure 4:
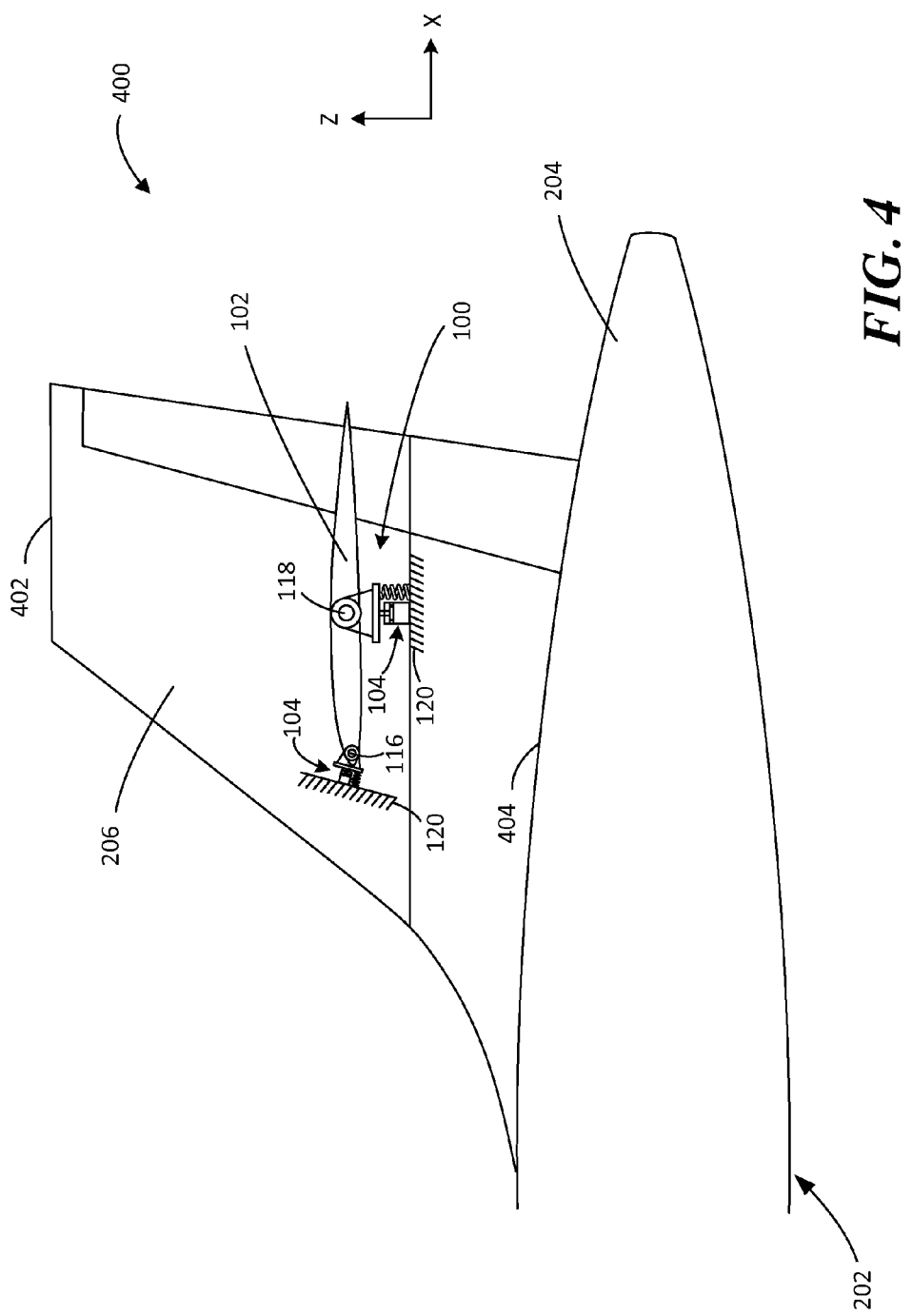
FIG. 4 is a side view of a vibration dampening system installed in an aircraft having a cruciform tail configuration according to various embodiments described herein.
Figure 5:
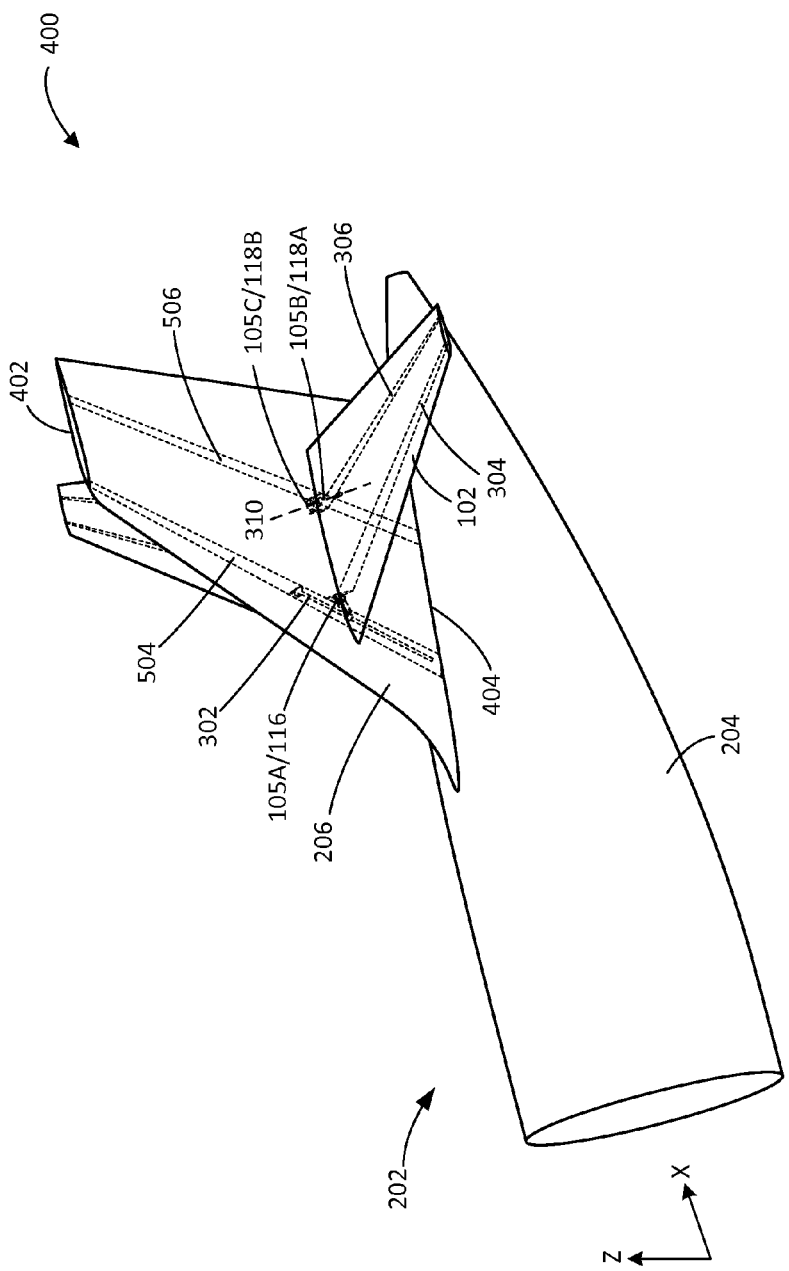
FIG. 5 is a perspective view of a vibration dampening system installed in an aircraft having a cruciform tail configuration according to various embodiments described herein.

FIGS. 4 and 5 show side and perspective views, respectively, of a vibration dampening system 100 installed in an aircraft 202 having a cruciform tail configuration 400 according to various embodiments described herein. With a cruciform tail configuration 400, the horizontal stabilizer 102 is mounted between a tip 402 and a root 404 of the vertical stabilizer 206. As seen in FIG. 5, a jack screw 302 couples a front portion 116 the horizontal stabilizer 102 to a vertical stabilizer front spar 504. A damper 104 is installed between the jack screw 302 and the vertical stabilizer front spar 504 (or structure 120), or between the jack screw 302 and the front portion 116 of the horizontal stabilizer 102. According to various embodiments, this damper 104 may be a passive damper 105A as discussed above, or an active damper described in further detail below with respect to FIGS. 10-12.

This example of a cruciform tail configuration 400 includes two pivot points 118A and 118B defining a pivot axis 310 around which the horizontal stabilizer 102 rotates for trimming via the jack screw 302. Two dampers, passive dampers 105B and 105C in this example, are mounted to the horizontal stabilizer 102 between the horizontal stabilizer rear spar 306 and a vertical stabilizer rear spar 506 at the pivot points 118A and 118B. The dampers operate in the same manner described above with respect to the low-tail configuration 200. In particular, the passive damper 105A is configured to dampen vibrational forces in the first degree of freedom substantially parallel to the x-axis, or fore and aft, while the passive dampers 105B and 105C are configured to dampen vibrational forces in the second degree of freedom substantially parallel to the z-axis, or up and down.

Figure 6:
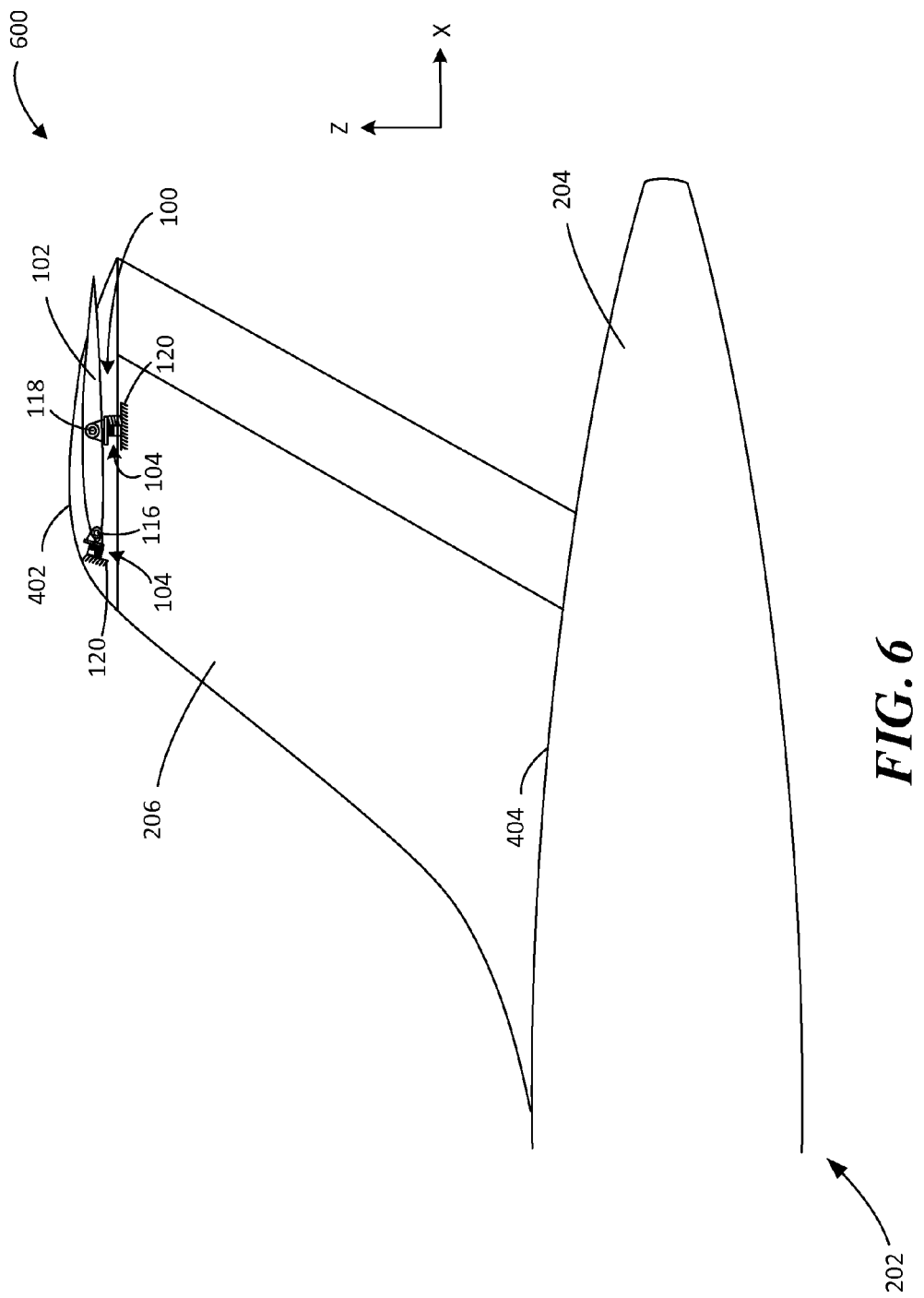
FIG. 6 is a side view of a vibration dampening system installed in an aircraft having a T-tail configuration according to various embodiments described herein.
Figure 7:
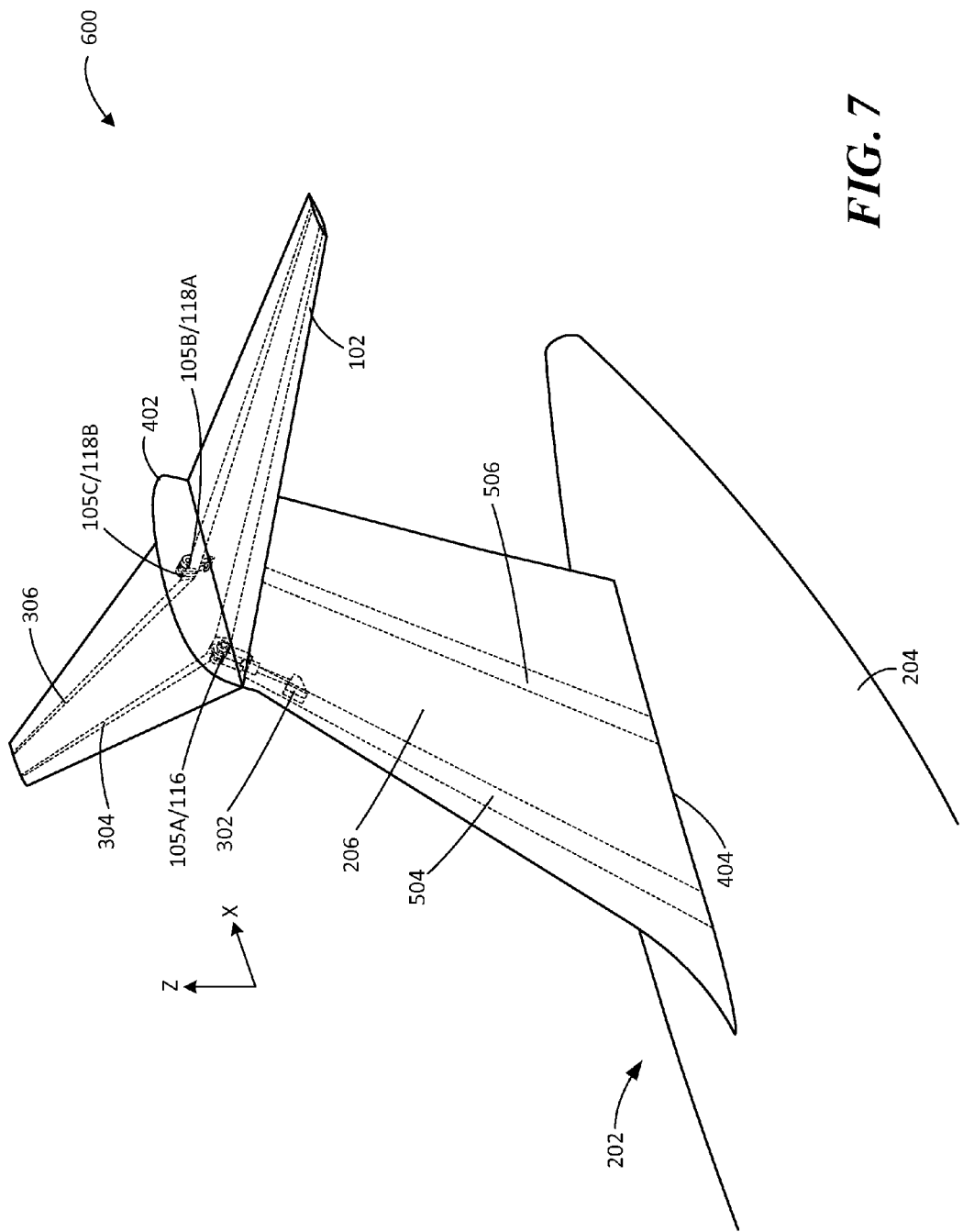
FIG. 7 is a perspective view of a vibration dampening system installed in an aircraft having a T-tail configuration according to various embodiments described herein.

FIGS. 6 and 7 show side and perspective views, respectively, of a vibration dampening system 100 installed in an aircraft 202 having a T-tail configuration 600 according to various embodiments described herein. Although the precise structure of the horizontal stabilizer 102 and vertical stabilizer 206 to which the vibration dampening system 100 is attached in the T-tail configuration 600 may differ slightly from that of the cruciform tail configuration 400 described with respect to FIGS. 4 and 5 below, the configuration and operation of the dampers 104 themselves is substantially the same in the T-tail configuration 600 shown in FIGS. 6 and 7. The main difference with the T-tail configuration 600 being that the horizontal stabilizer 102 is mounted at or proximate to the tip 402 of the vertical stabilizer 206 rather than at a location between the tip 402 and root 404.

Figure 8:
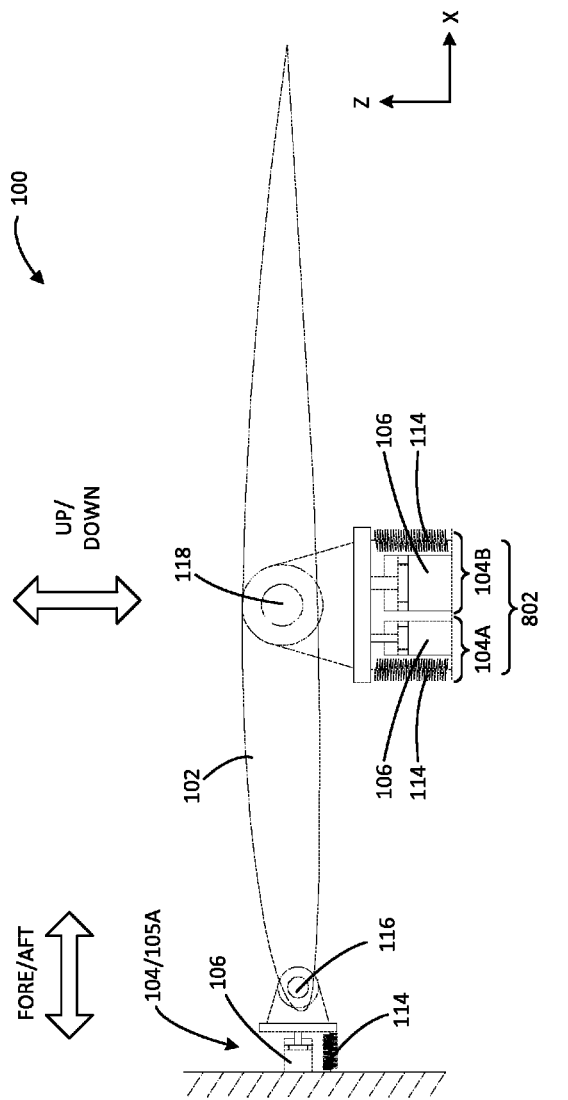
FIG. 8 is a side view of a vibration dampening system having a plurality of dampers at a single location according to various embodiments described herein.

Turning now to FIG. 8, and alternative embodiment of the vibration dampening system 100 will be described. In the example shown in FIG. 8, the vibration dampening system 100 includes a damper 104, configured as a passive damper 105A, coupled to the front portion 116 of the horizontal stabilizer 102, and a bank 802 of parallel dampers 104 coupled to a pivot point 118 of the horizontal stabilizer 102. The bank 802 of dampers 104 replaces a single damper 104 in the various embodiments described above. The bank 802 of this example includes two dampers 104A and 104B. Each of the dampers 104A and 104B of the bank 802 is a visco-elastic damper, having a viscous damper 106 and a spring 114. Each visco-elastic damper may be tuned or configured to mitigate vibrations at a particular frequency, which may differ from other targeted frequencies within the bank 802 of dampers 104. In doing so, readily available visco-elastic dampers may be selected according to a desired target frequency and aggregated to create a bank 802 that mitigates vibrations at a frequency or frequencies that may differ from those of the individual dampers 104 within the bank 802. Each damper 104 within a bank 802 may affect the operation of other dampers 104 within the bank 802, however, the affect may be determined using known engineering techniques such that the bank 802 may be designed accordingly. The number and type of dampers 104 within a bank 802 may vary without departing from the scope of this departure. Although the bank 802 is shown in FIG. 8 to be coupled to the pivot point 118 with a single passive damper 105A coupled to the front portion 116 of the horizontal stabilizer 102, a bank 802 may be utilized at any or all damper positions within the vibration dampening system 100.

Figure 9:
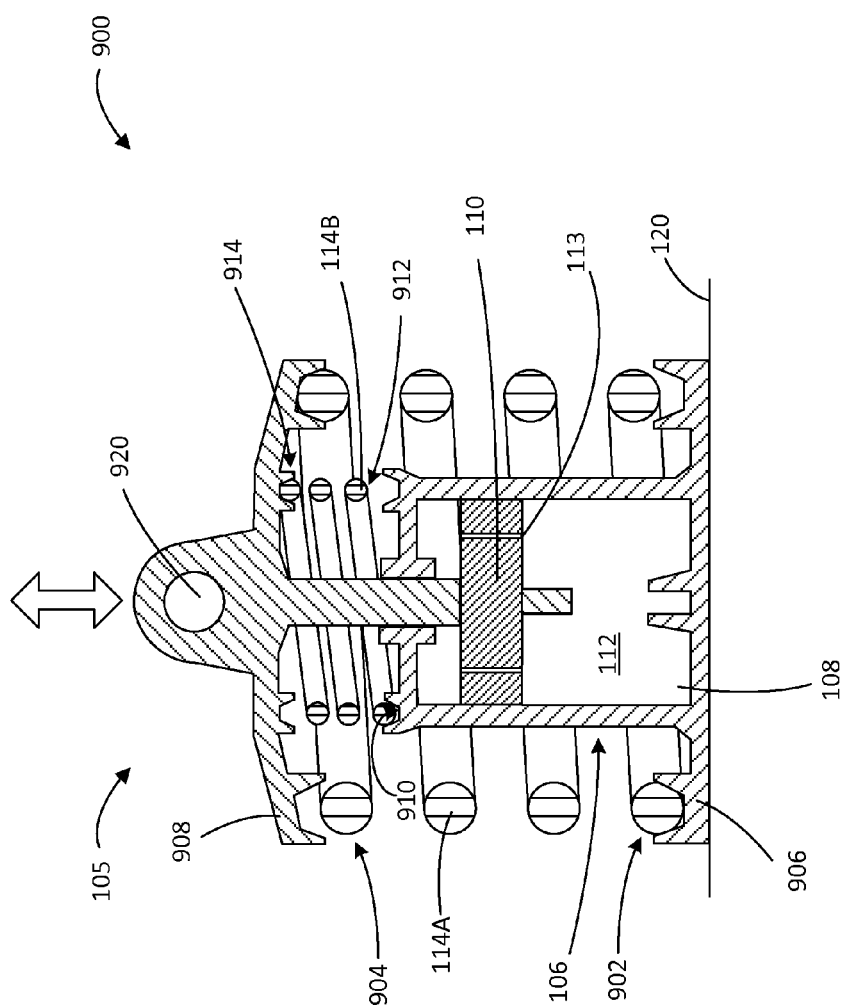
FIG. 9 is a cross-sectional view of a visco-elastic damper having a plurality of concentrically arranged springs according to various embodiments described herein.

FIG. 9 is a cross-sectional view of a visco-elastic damper (or passive damper 105) having a concentric arrangement 900 according to various embodiments. The concentric arrangement 900 includes a plurality of concentrically arranged springs 114A and 114B positioned around a viscous damper 106. According to this example, a first spring 114A abuts a fixed bottom damper wall 906 at a first end 902 of the first spring 114A. The first spring 114A abuts a moveable top damper wall 908 at a second end 904 of the first spring 114A. The moveable top damper wall 908 is connected to a damper piston 110 within a viscous fluid chamber 108. The moveable top damper wall 908 is also connected to a horizontal stabilizer 102 at a connection point 920 and to a structure 120 at the fixed bottom damper wall 906. Vibrational forces from the horizontal stabilizer 102 at the connection point 920 translate the damper piston 110 upwards and downwards, as indicated by the open arrows. Linear translation of the damper piston 110 is resisted upon by viscous fluid 112 within the viscous fluid chamber 108 while compressing the first spring 114A. The second spring 114B is positioned within the first spring 114A and abuts a top surface 910 of the viscous fluid chamber 106 at a first inner spring end 912 and the moveable top damper wall 908 at a second inner spring end 914. The visco-elastic damper 104 mitigates the vibrational forces in a manner described above. However, because of the different characteristics of the first spring 114A and the second spring 114B, the visco-elastic damper 104 may be tuned to target different vibration frequencies.

According to one embodiment, the displacement length of one of either the first spring 114A or 114B may be selected such that the moveable top damper wall 908 may translate a desired distance with resistance from one spring before the other spring is engaged. The successive engagement of the springs 114A and 114B as a function of the displacement of the damper piston 110 allows a variable natural frequency for the visco-elastic damper as a function of damper displacement. This aspect of the visco-elastic damper 105 can be tailored to passively absorb only the most critical vibration frequencies at different flight conditions or engine settings. As will be described in greater detail below, this passive damper 105 may be combined with a variable, or active damper, if a different damping coefficient is desired at an alternative flight condition.

As an example illustrating the functionality of a passive damper 105 having the concentric arrangement 900 shown and described above, the oscillation frequency of the horizontal stabilizer 102 exposed to prop wash at takeoff is most likely higher (due to higher fan/engine RPM) and the magnitude of the oscillatory displacements are larger than that of a cruise condition due to potentially faster exit airflow 210 and corresponding prop wash. A sequential spring system can be designed to operate at a high frequency/high displacement condition at takeoff during which both springs 114A and 114B might be engaged due to the higher displacements of the horizontal stabilizer 102 in this condition. The same system will also be able to operate optimally during cruise flight for which the horizontal stabilizer 102 is subjected to a lower frequency vibration and lower displacement due to different engine settings.

FIGS. 1-9 have described operation of a vibration dampening system 100 utilizing passive dampers 105. One advantage to using passive dampers is that they are relatively simple, inexpensive, and reliable. However, according to alternative embodiments, any or all dampers 104 within a vibration dampening system 100 described herein may be active dampers. For the purposes of this disclosure, "active dampers" are dynamically adaptable to vary damping characteristics according to real-time or estimated vibration states associated with the horizontal stabilizer 102. According to some embodiments, active dampers utilize linear actuators to induce motion in a desired direction at a desired frequency or frequencies to mitigate corresponding vibrations. According to alternative embodiments, the active dampers may operate via altering a pressure of a fluid within a fluid chamber of a visco-elastic damper rather than utilizing a linear actuator. The induced motion created by the active dampers may be based on an actual real-time vibration state of the horizontal stabilizer as measured by one or more sensors or accelerometers, based on an estimated vibration state as predicted according to one or more aircraft parameters, or a combination thereof.

As described previously, the aircraft 202 operates at various flight/engine conditions which results in a constantly changing forcing function for various forces and moments acting on a horizontal stabilizer 102 subjected to distortion from the exit airflow 210 or other vibrational forces. An active dampening system has the advantage of being adaptable to the operating conditions and therefore providing a superior vibrational dampening behavior. It should be noted that active dampening system can be designed in a way to allow for redundancy of the systems (multiple identical, independent systems), as well as a potential passive backup system.

Figure 10:
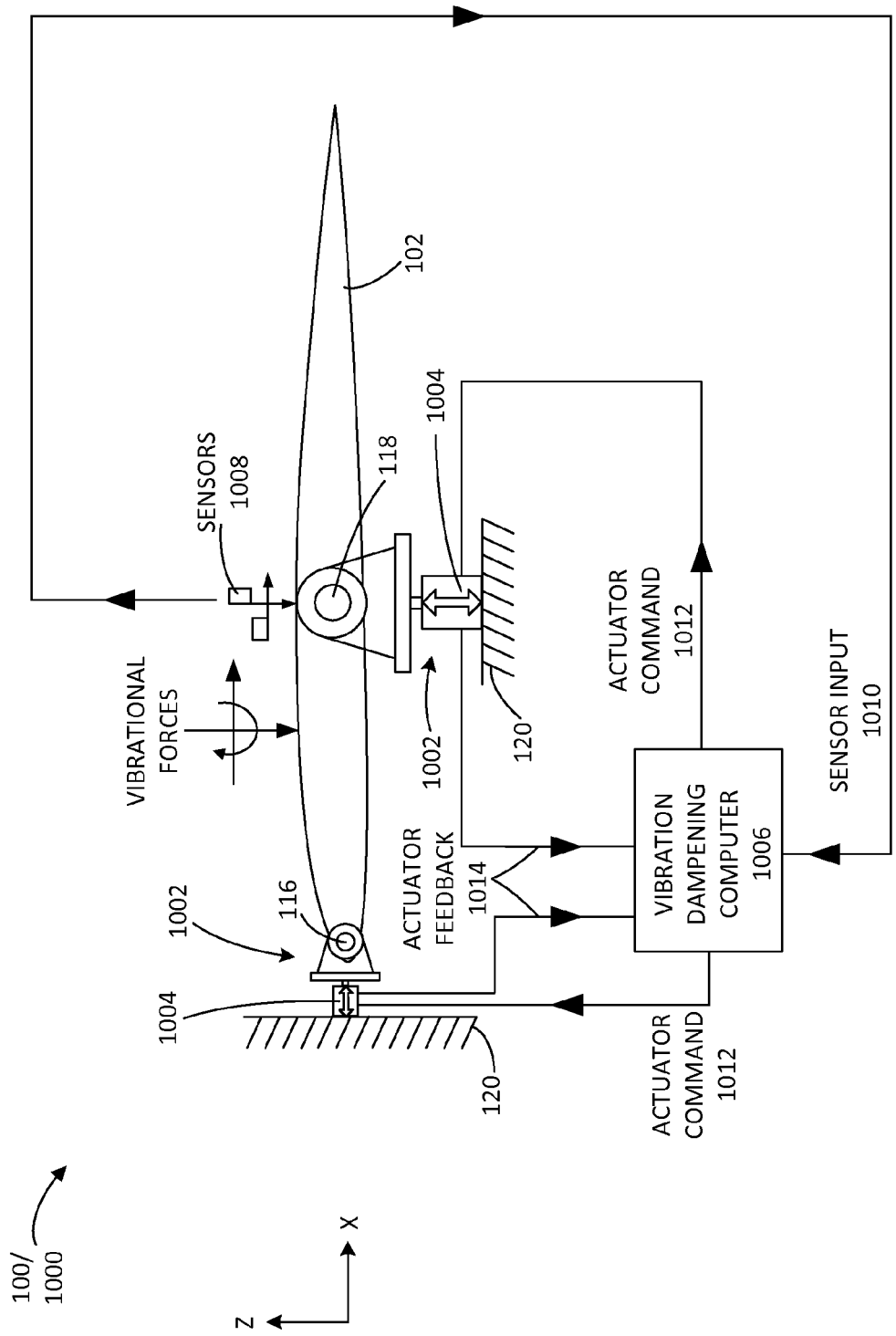
FIG. 10 is a system diagram of a vibration dampening system using linear actuators as active dampers and a real-time vibration state feedback according to various embodiments described herein.

Looking at FIG. 10, a vibration dampening system 100 includes an active dampening system 1000 utilizing active dampers 1002. The active dampers 1002 may include electric linear actuators 1004 that may be selectively activated via an actuator command 1012 from a vibration dampening computer 1006 to translate up and down or fore and aft to apply a mitigating force that counters the vibrational forces experienced by the horizontal stabilizer 102. In this example, sensors 1008 are positioned on the horizontal stabilizer 102 and/or the fuselage 204 and corresponding structure 120. The sensors 1008 may include any type and number of accelerometers or position sensors operative to measure and provide real-time vibration states associated with the vibrational forces to the vibration dampening computer 1006 as sensor input 1010. It should be appreciated that "real-time vibration state" may be raw acceleration and position data or some resulting data calculated using the real-time acceleration and position data, such as frequency and amplitude of vibrations in the horizontal stabilizer 102. The sensors 1008 take measurements along two principle axes of arbitrary orientation as long as the axes are substantially normal to each other and their offset from the horizontal stabilizer 102 or fuselage 204 is known.

Using the sensor input 1010, the vibration dampening computer 1006 determines the optimal force (if the active dampening system 1000 is a purely electric damping system as described here with respect to FIG. 10) or natural frequency/damping ratio (if the active dampening system 1000 is a semi-passive system as discussed below with respect to FIG. 12) to be executed by the active dampers 1002. The vibration dampening computer 1006 then provides the optimal force/position determination as an actuator command 1012 to the active dampers 1002 for actuation. Each active damper 1002 relays back a position versus time input signal as actuator feedback 1014 to the vibration dampening computer 1006 to ensure a closed control loop.

Figure 11:
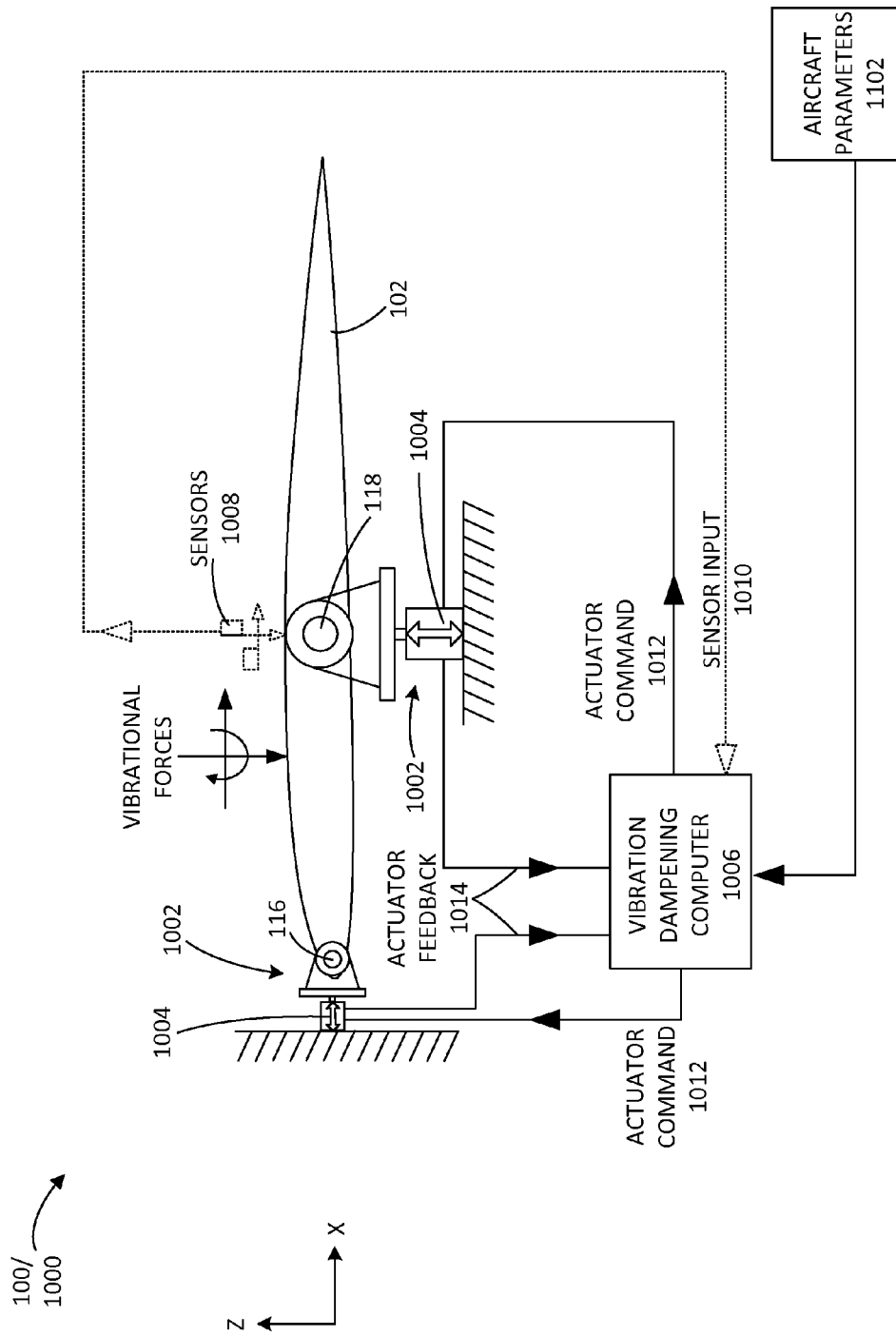
FIG. 11 is a system diagram of a vibration dampening system using linear actuators as active dampers and an estimated vibration state according to various embodiments described herein.

FIG. 11 illustrates an alternative embodiment of an active dampening system 1000 utilizing active dampers 1002. This example is similar to that described above with respect to FIG. 10, with the primary difference being the lack of sensor input 1010. With the system described above, sensors 1008 are used to measure and provide real-time vibration states associated with the vibrational forces on the horizontal stabilizer 102 to the vibration dampening computer 1006. However, in this alternative embodiment, rather than utilizing sensors 1008, the vibration dampening computer 1006 utilizes one or more aircraft parameters 1102 corresponding to a current state of the aircraft 202 or one or more aircraft systems in order to determine an estimated vibration state. The vibration dampening computer 1006 utilizes the estimated vibration state in the same manner described above with respect to the real-time vibration state in order to determine an actuator command that mitigates the estimated vibrations. For the purposes of this embodiment, the broken lines corresponding to the sensors 1008 and associated sensor input 1010 are used to indicate an optional inclusion of sensors 1008 to be discussed in further detail below with respect to yet another alternative embodiment.

The aircraft parameters 1102 may include any number and type of information that may be applicable in determining the forces acting on the horizontal stabilizer 102 at any given time using known analytical techniques. For example, the aircraft parameters 1102 may include, but are not limited to, one or more engine settings, flight characteristics, aircraft characteristics, flight control settings, ambient parameters, or a combination thereof. Non-limiting examples of these illustrative aircraft parameters will now be provided. Engine settings may include engine revolutions per minute (RPM) of various spools, thrust settings, blade pitch or engine pitch (if variable). Flight characteristics may include air speed, angle of attack, pitch attitude, roll attitude, yaw attitude, and flight path angle. Aircraft characteristics may include aircraft weight and center of gravity. Flight control settings may include horizontal stabilizer incidence angle and elevator and trim-tab effective angles. Ambient parameters may include ambient pressure, temperature, and relative humidity.

Using these aircraft parameters 1102, the vibration dampening computer 1006 can analyze the predicted vibrational forces acting on the horizontal stabilizer 102 and use the resulting estimated vibration state rather than the real-time vibration state measured by the sensors 1008 discussed with respect to the embodiment of FIG. 10 above to determine an appropriate actuator command 1012. Referring now to the active dampening system 1000 of FIG. 11, including the broken lines associated with the sensors 1008, a third implementation of the active dampening system 1000 will be described.

In this third embodiment of the active dampening system 1000, the vibration dampening computer 1006 utilizes aircraft parameters 1102 to determine the estimated vibration state and corresponding actuator command 1012. In addition, the vibration dampening computer 1006 receives sensor input 1010 from the sensors 1008 measuring the real-time vibration state of the horizontal stabilizer 102. Utilizing the real-time vibration state of the horizontal stabilizer 102, the vibration dampening computer 1006 may determine a corresponding actuator command 1012, which can be used to adjust the actuator command 1012 provided from the estimated vibration state. In this manner, the active dampening system 1000 may provide actuator commands 1012 based on predicted vibration states determined from numerous aircraft parameters, while measuring actual vibration states as they occur and making corrections accordingly. This type of dual-input system may be more complex than those previously described, but may operate faster and more accurately.

Figure 12:
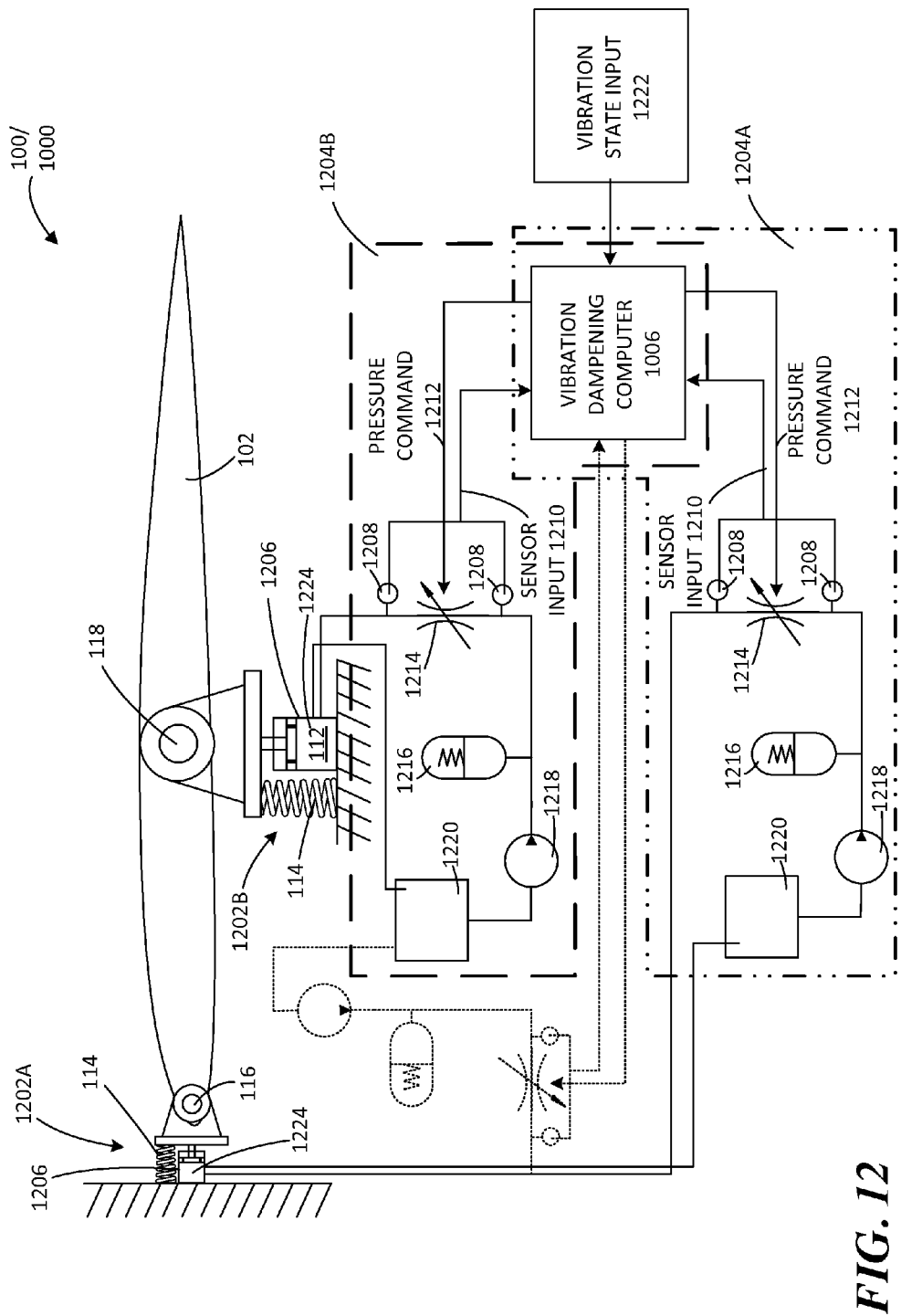
FIG. 12 is a system diagram of a vibration dampening system using active visco-elastic dampers according to various embodiments described herein.

FIG. 12 illustrates yet another alternative embodiment for an active dampening system 1000. This system utilizes active visco-elastic dampers 1202A and 1202B (collectively and generally referred to as "active visco-elastic dampers 1202") to mitigate vibrational forces applied to the horizontal stabilizer 102. This embodiment utilizes the vibration dampening computer 1006 to actively apply a mitigating force to the horizontal stabilizer 102 via the active visco-elastic dampers 1202, similar to the systems discussed above with respect to the electric linear actuators 1004 of FIGS. 10 and 11 above. However, instead of employing electric linear actuators, the active dampening system 1000 of this example utilizes active visco-elastic dampers 1202. Like the passive dampers 105 described above, the active visco-elastic dampers 1202 have an elastic element such as a spring 114 and a viscous damper, which is a variable viscous damper 1206. The difference between the viscous damper 106 of previously described passive systems and the variable viscous damper 1206 of this embodiment that results in an active system is that the vibration dampening computer 1006 is operative to alter the pressure within the viscous fluid chamber 108 to move the damper piston 110 up and down as needed to actively mitigate the vibrational forces. Because the variable viscous damper 1206 allows for the pressure of the viscous fluid 112 within to be altered, the chamber within the variable viscous damper 1206 is referred to as a variable coefficient dampening element 1224.

The active dampening system 1000 of FIG. 12 operates via the vibration dampening computer 1006 controlling the pressure within one or more associated variable coefficient dampening elements 1224. This is done by actuating a variable flow valve, i.e. a flow control valve, 1214 within a fluid accumulator circuit 1204A or 1204B (referred to collectively and generally as a "fluid accumulator circuit 1204") to add or remove viscous fluid 112 and corresponding pressure from the variable viscous damper 1206. Altering the pressure within the variable coefficient dampening element 1224 alters the damping coefficient (c), which in turn alters the dampening characteristics of the active visco-elastic damper 1202.

To control the pressure of the viscous fluid 112, a fluid accumulator circuit 1204 may be used. For illustrative purposes, the fluid accumulator circuit 1204B that is fluidly coupled to the active visco-elastic damper 1202B will be described. The fluid accumulator circuit 1204B is outlined with a dashed line in FIG. 12. Similarly, a second fluid circuit, or fluid accumulator circuit 1204A, is associated with the active visco-elastic damper 1202A and is outlined with a dotted and dashed line for clarity purposes.

The fluid accumulator circuit 1204B includes pressure sensors 1208 in series with a variable flow valve 1214. The pressure sensors 1208 provide the vibration dampening computer 1006 with sensor input 1210 regarding the pressure within the variable coefficient dampening element 1224 and within the fluid accumulator circuit 1204B. Actuation of the variable flow valve 1214 moves fluid from the accumulator 1216 to the variable coefficient dampening element 1224 and similarly releases pressure from the variable coefficient dampening element 1224, allowing the vibration dampening computer 1006 to manage the dampening coefficient (c) within the active visco-elastic damper 1202. The fluid accumulator circuit 1204B additionally includes a reservoir 1220 for storage of viscous fluid 112 and a pump 1218 for charging the system.

The vibration dampening computer 1006 in this embodiment receives vibration state input 1222, which is used to determine the pressure command 1212 for the variable flow valve 1214. The vibration state input 1222 may include a real-time vibration state or corresponding acceleration and position data, which may be measured in real-time by a number of accelerometers and position sensors as described above with respect to FIG. 10. Alternatively, the vibration state input 1222 may include aircraft parameters 1102, which may be used by the vibration dampening computer 1006 to determine an estimated vibration state as described above with respect to FIG. 11.

FIG. 12 illustrates alternative embodiments for controlling multiple active visco-elastic dampers 1202 within an active dampening system 1000. First, each active visco-elastic damper 1202 may be coupled to a separate fluid accumulator circuit 1204. Ignoring the dotted lines in FIG. 12, active visco-elastic damper 1202A is coupled to the fluid accumulator circuit 1204A, while active visco-elastic damper 1202B is coupled to the fluid accumulator circuit 1204B. The vibration dampening computer 1006 controls both fluid accumulator circuits 1204A and 1204B. Alternatively, components of a fluid accumulator circuit 1204 that may be selected or designed to provide fluid to multiple active visco-elastic dampers 1202 may be shared. Looking at FIG. 12 including the components drawn with a dotted line, but ignoring the fluid accumulator circuit 1204A, a smaller fluid accumulator circuit supplying viscous fluid 112 to both active visco-elastic dampers 1202A and 1202B can be seen. It should be appreciated that the drawings have been simplified for clarity purposes and should not be considered limiting. There may be additional or fewer components than those shown in FIG. 12 and the other drawings.

Figure 13:
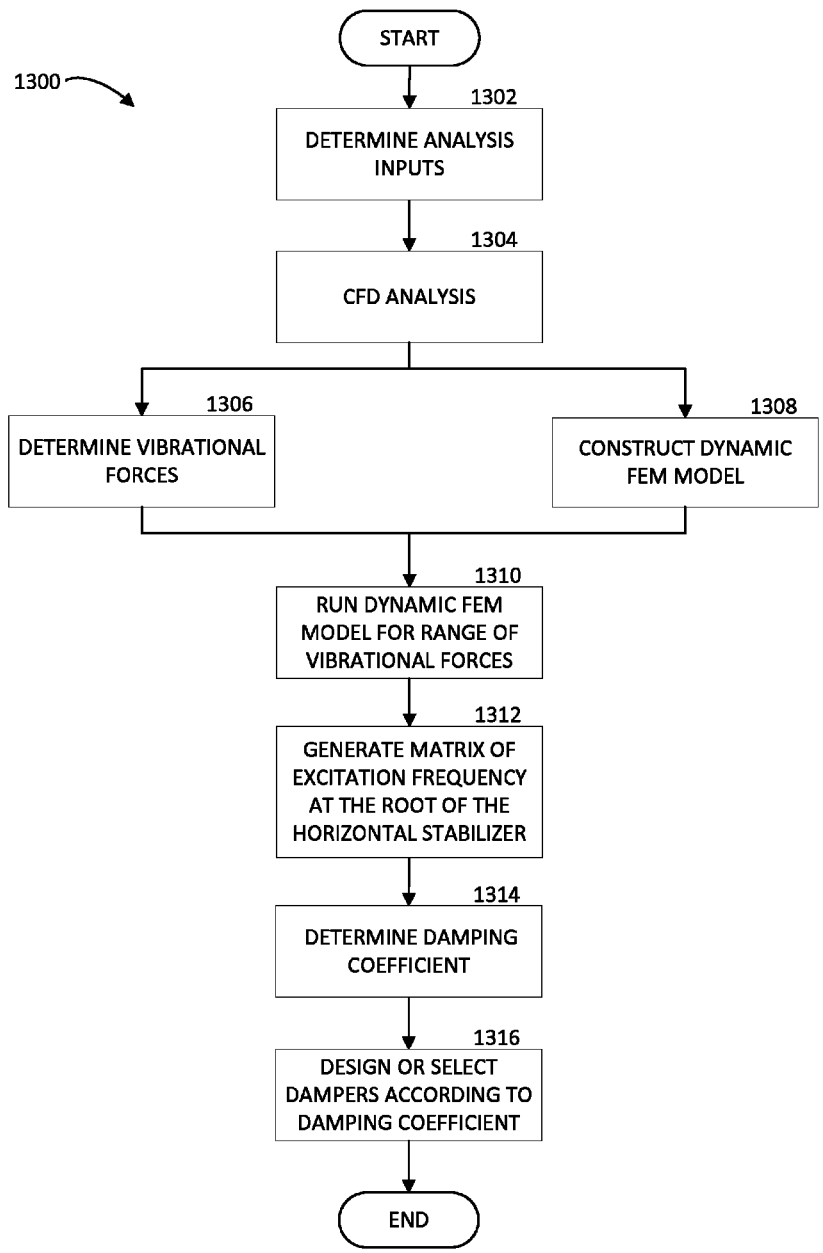
FIG. 13 is a flow diagram showing a method for determining damper characteristics for mitigating vibration in a horizontal stabilizer of an aircraft according to various embodiments presented herein.

Turning to FIG. 13, a method for determining damper characteristics for mitigating vibration in a horizontal stabilizer 102 of an aircraft 202 according to various embodiments presented herein will be described. It should be appreciated that more or fewer operations may be performed than shown in the figures and described herein. These operations may also be performed in parallel, or in a different order than those described herein. FIG. 13 shows a routine 1300 for determining the characteristics of the dampers of a vibration dampening system 100. The routine 1300 begins at operation 1302, where the inputs for the analysis are determined. The inputs may include a number of parameters, including but not limited to, the aircraft geometry and overall structural arrangement of the aircraft 202, the material properties for the horizontal stabilizer 102, engine core and fan performance parameters, a range of operating conditions corresponding to the design mission profile (i.e., Mach number and altitude), and weighting factors to be provided for the mission profile. The weighting factors indicate the relative significance of the various parameters from a noise and fatigue perspective.

From operation 1302, the routine 1300 continues to operation 1304, where an unsteady, powered computational fluid dynamics (CFD) analysis is performed using the analysis inputs determined at operation 1302 for a number of flight conditions attainable in a mission. The routine 1300 continues in parallel to operations 1306 and 1308. At operation 1306, the vibrational forces acting on the horizontal stabilizer 102 are determined by post-processing the CFD results. This process models the unsteady lift, drag, and pitching moments acting upon the horizontal stabilizer 102 immersed in the exit airflow 210. In other words, operation 1306 estimates the lift, drag, and pitching moments as a function of time acting on the horizontal stabilizer 102 experiencing vibrational forces from the turbulent prop wash.

At operation 1308, a dynamic finite element method (FEM) model is constructed using the horizontal stabilizer 102 geometry and mechanical properties determined in operation 1302. From operations 1306 and 1308, the routine 1300 continues to operation 1310, where the dynamic FEM model is run for a range of vibrational forces (lift, drag, and pitching moments) obtained from the CFD analysis. At operation 1312, a matrix of excitation frequency ($\omega_0$) at the root of the horizontal stabilizer 102 (i.e., at the pivot points 118) for the range of flight conditions provided.

The routine 1300 continues to operation 1314, where the linear ordinary differential equations of motion are solved to identify an adequate damping coefficient and damping ratio such that the vibration dampening system 100 would cause the vibrations to dampen substantially, within the requirements and technical limitations associated with a given design problem and what the general requirements of the aircraft may prescribe. According to one non-limiting implementation, the linear ordinary differential equations of motion are solved to identify an adequate damping coefficient (c) and damping ratio ($\zeta$) such that ($\zeta$) is greater than 1. At operation 1316, the dampers 104 are selected or designed according to the damping coefficient (c) determined at operation 1314, and the routine 1300 ends.

Figure 14:
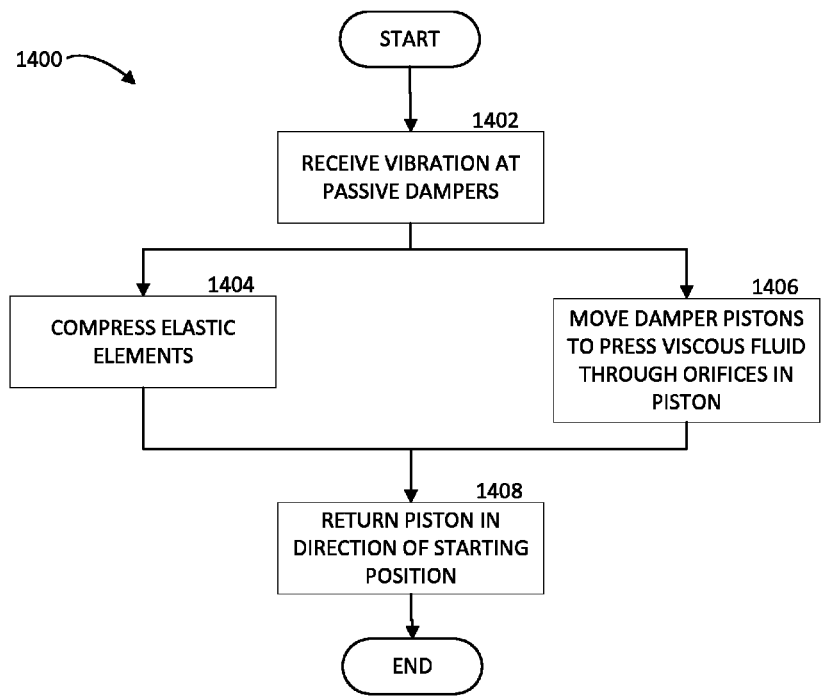
FIG. 14 is a flow diagram showing a method for mitigating vibration in a horizontal stabilizer of an aircraft utilizing passive dampers according to various embodiments presented herein.

FIG. 14 shows a routine 1400 for mitigating vibration in a horizontal stabilizer 102 of an aircraft 202 utilizing passive dampers 105 according to various embodiments presented herein. The routine 1400 begins at operation 1402, where vibrational forces are received at the passive dampers 105 of a vibration dampening system 100. Operations 1404 and 1406 occur in parallel. At operation 1404, the elastic elements of a visco-elastic damper are compressed. As discussed above, depending on the configuration of the passive dampers 105, there may be a single elastic element, such as a spring 114, multiple elastic elements, and/or concentrically arranged springs 114. In some embodiments, such as with the concentric arrangement 900, the spring compression may be sequential, with a first spring compressing to a predetermined displacement before the second spring is engaged.

At operation 1406, the damper pistons 110 associated with the viscous dampers 108 are moved from the applied vibrational forces. This movement presses the viscous fluid 112 through orifices 113 in the damper pistons 110, which operates to resist or slow the movement of the damper pistons 110. From operations 1404 and 1406, the routine 1400 continues to operation 1408, where the damper pistons 110 are returned in a direction of their starting positions via the force exerted by the compressed elastic elements. This resistant oscillatory movement of the passive dampers 105 effectively mitigates the vibrational forces applied to the horizontal stabilizer 102.

Figure 15:
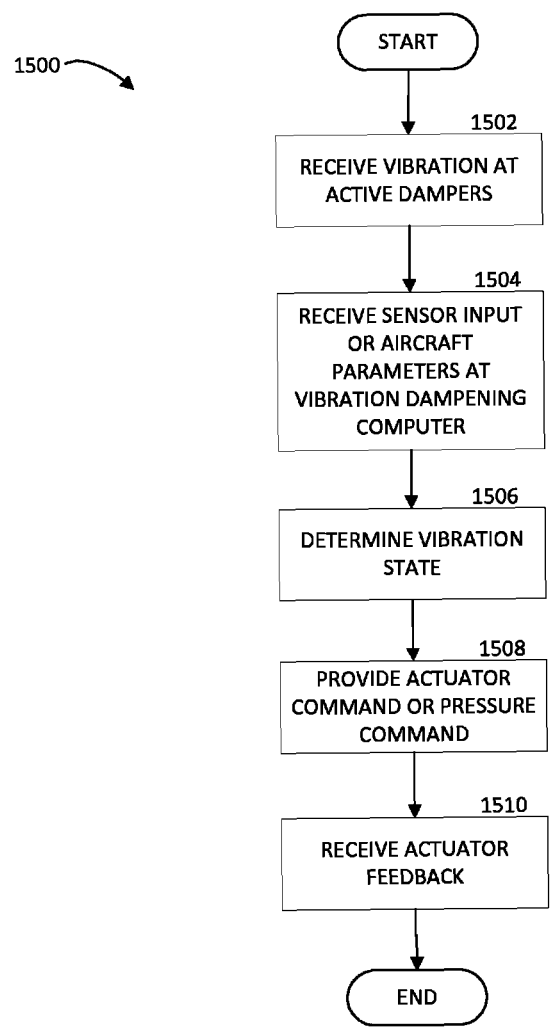
FIG. 15 is a flow diagram showing a method for mitigating vibration in a horizontal stabilizer of an aircraft utilizing active dampers according to various embodiments presented herein.

FIG. 15 shows a routine 1500 for mitigating vibration in a horizontal stabilizer 102 of an aircraft 202 utilizing active dampers 1002 according to various embodiments presented herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

The routine 1500 begins at operation 1502, where vibrational forces are received at the active dampers 1002. At operation 1504, the vibration dampening computer 1006 receives sensor input 1010 from the sensors 1008 if real-time vibration states are measured. If sensors 1008 are not used to measure real-time vibration states, then the vibration dampening computer 1006 receives aircraft parameters 1102 from the various aircraft systems on the aircraft 202. As discussed above, according to one embodiment, the vibration dampening computer 1006 receives both sensor input 1010 and aircraft parameters 1102.

From operation 1504, the routine 1500 continues to operation 1506, where the vibration state is determined, based either on real-time measurements from the sensors 1008 or estimated according to the received aircraft parameters 1102. At operation 1508, the vibration dampening computer 1006 determines an actuator command 1012 or a pressure command 1212 based on the vibration state, and provides the appropriate command to the active dampers 1002 or the variable flow valve 1214. The vibration dampening computer 1006 receives feedback from the active dampers 1002 at operation 1510, and the routine 1500 ends.

Figure 16:
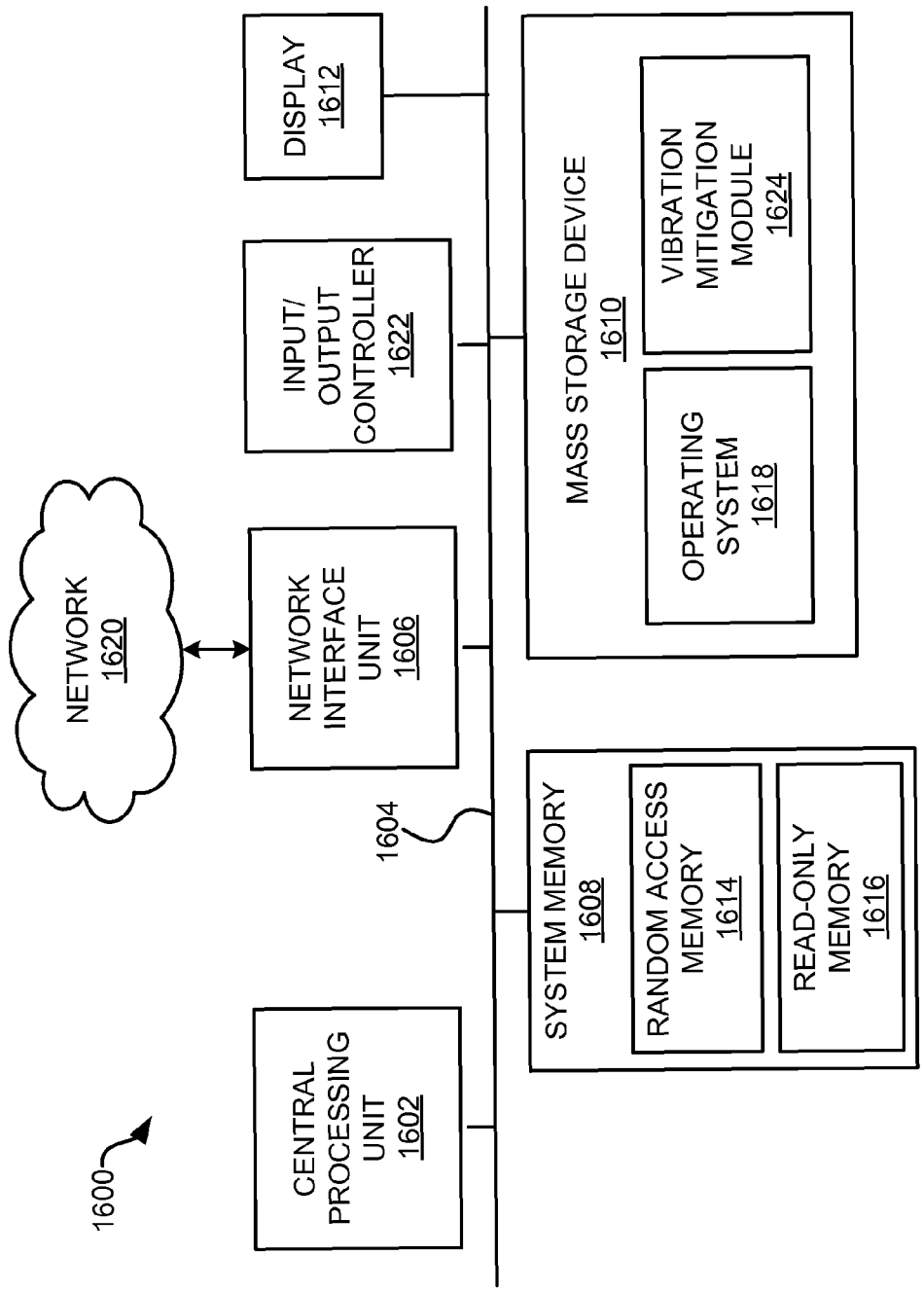
FIG. 16 is a computer diagram showing various components of a vibration dampening computer according to various embodiments presented herein.

FIG. 16 shows an illustrative computer architecture 1600 of a vibration dampening computer 1006 described above, capable of executing the software components described herein mitigating vibration in a horizontal stabilizer 102 in the manner presented above. The computer architecture 1600 includes a central processing unit 1602 (CPU), a system memory 1608, including a random access memory 1614 (RAM) and a read-only memory 1616 (ROM), and a system bus 1604 that couples the memory to the CPU 1602.

The CPU 1602 is a standard programmable processor that performs arithmetic and logical operations necessary for the operation of the computer architecture 1600. The CPU 1602 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 1600 also includes a mass storage device 1610 for storing an operating or control system 1618, as well as specific application modules or other program modules, such as a vibration mitigation module 1624 operative to provide actuator commands 1012 and pressure commands 1212 to the dampers 104 according to the various embodiments described above. The mass storage device 1610 is connected to the CPU 1602 through a mass storage controller (not shown) connected to the bus 1604. The mass storage device 1610 and its associated computer-readable media provide non-volatile storage for the computer architecture 1600.

The computer architecture 1600 may store data on the mass storage device 1610 by transforming the physical state of the mass storage device to reflect the information being stored. The specific transformation of physical state may depend on various factors, in different implementations of this description. Examples of such factors may include, but are not limited to, the technology used to implement the mass storage device 1610, whether the mass storage device is characterized as primary or secondary storage, and the like. For example, the computer architecture 1600 may store information to the mass storage device 1610 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 1600 may further read information from the mass storage device 1610 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 1600. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 1600.

According to various embodiments, the computer architecture 1600 may operate in a networked environment using logical connections to other aircraft systems and remote computers through a network, such as the network 1620. The computer architecture 1600 may connect to the network 1620 through a network interface unit 1606 connected to the bus 1604. It should be appreciated that the network interface unit 1606 may also be utilized to connect to other types of networks and remote computer systems. The computer architecture 800 may also include an input-output controller 1622 for receiving and processing input from a number of other devices, including a control display unit, a keyboard, mouse, electronic stylus, or touch screen that may be present on a connected display 1612. Similarly, the input-output controller 1622 may provide output to the display 1612, a printer, or other type of output device.

Based on the foregoing, it should be appreciated that technologies for mitigating vibrations in a horizontal stabilizer 102 are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A vibration dampening system for a horizontal stabilizer of an aircraft, the system comprising:
    a first damper coupled to a front portion of the horizontal stabilizer at a first location, the first damper configured to dampen a vibrational force in a first degree of freedom; and
    a second damper coupled to the horizontal stabilizer proximate to a mounting point of the horizontal stabilizer at a second location different than the first location, the second damper configured to dampen the vibrational force in a second degree of freedom;
    wherein each of the first damper and the second damper is independently mechanically coupled to the horizontal stabilizer.

2. The vibration dampening system of claim 1, wherein the mounting point comprises a pivot point.

3. The vibration dampening system of claim 2, wherein the pivot point comprises a first pivot point around a pitch axis of the horizontal stabilizer, and wherein the vibration dampening system further comprises a third damper coupled to the horizontal stabilizer proximate to a second pivot point around the pitch axis of the horizontal stabilizer, the third damper configured to dampen the vibrational force in the second degree of freedom.

4. The vibration dampening system of claim 2, wherein at least one of the first damper and the second damper comprises a passive damper.

5. The vibration dampening system of claim 4, wherein the passive damper comprises a visco-elastic damper.

6. The vibration dampening system of claim 5, wherein the visco-elastic damper comprises two springs, a first spring configured to mitigate vibrations according to a first frequency, and a second spring configured to mitigate vibrations according to a second frequency.

7. The vibration dampening system of claim 6, wherein one of the first and second frequencies is selected based on a frequency of a disturbance in an exit airflow from a ducted fan engine.

8. The vibration dampening system of claim 6, wherein the two springs are concentrically arranged within the visco-elastic damper.

9. The vibration dampening system of claim 8, wherein the first spring abuts a fixed bottom damper wall at a first end and a moveable top damper wall at a second end, the moveable top damper wall connected to a damper piston within a viscous fluid chamber such that linear translation of the damper piston is resisted upon by viscous fluid within the viscous fluid chamber while compressing the first spring, and wherein the second spring is positioned within the first spring and abuts a top surface of the viscous fluid chamber at a first inner spring end and the moveable top damper wall at a second inner spring end.

10. The vibration dampening system of claim 6, wherein the two springs are separated from one another.

11. The vibration dampening system of claim 2, wherein the first degree of freedom comprises a fore-aft direction substantially parallel to a longitudinal axis of the aircraft and wherein the second degree of freedom comprises an up-down direction substantially normal to the longitudinal axis of the aircraft.

12. The vibration dampening system of claim 2, wherein the first degree of freedom comprises a fore-aft direction substantially parallel to a longitudinal axis of the aircraft and wherein the second degree of freedom comprises an angular direction with respect to the longitudinal axis of the aircraft.

13. The vibration dampening system of claim 2, further comprising a bank of parallel dampers coupled to the horizontal stabilizer proximate to the pivot point of the horizontal stabilizer, wherein the bank of parallel dampers comprises the second damper and a third damper, the second damper configured to dampen the vibrational force in the second degree of freedom within a first frequency and the third damper configured to dampen the vibrational force in the second degree of freedom within a second frequency.

14. The vibration dampening system of claim 2, wherein at least one of the first damper and the second damper comprises an active damper.

15. The vibration dampening system of claim 14, wherein the active damper comprises an electric linear actuator, and wherein the vibration dampening system further comprises:
a vibration dampening computer operative to determine an actuator command to mitigate a vibration frequency associated with the horizontal stabilizer, and to provide the actuator command to the electric linear actuator for execution by the electric linear actuator.

16. The vibration dampening system of claim 15, the system further comprising:
a plurality of accelerometers or position sensors configured to measure a real-time vibration state associated with the horizontal stabilizer and to provide the real-time vibration state to the vibration dampening computer,
wherein determining the actuator command to mitigate the vibration frequency comprises determining the actuator command to mitigate the real-time vibration state measured by the plurality of accelerometers or position sensors.

17. The vibration dampening system of claim 15, wherein determining the actuator command to mitigate the vibration frequency comprises:
receiving one or more aircraft parameters corresponding to a current state of the aircraft or an aircraft system;
determining an estimated vibration state associated with the horizontal stabilizer based on the one or more aircraft parameters; and
determining the actuator command to mitigate the estimated vibration state.

18. The vibration dampening system of claim 17, wherein the one or more aircraft parameters comprise:
one or more of an engine setting, a flight characteristic, an aircraft characteristic, a flight control setting, and an ambient parameter.

19. The vibration dampening system of claim 15, the system further comprising:
a plurality of accelerometers or position sensors configured to measure a real-time vibration state associated with the horizontal stabilizers and to provide the real-time vibration state to the vibration dampening computer,
wherein determining the actuator command to mitigate the vibration frequency comprises:
receiving one or more aircraft parameters corresponding to a current state of the aircraft or an aircraft system;
determining an estimated vibration state associated with the horizontal stabilizer based on the one or more aircraft parameters;
determining the actuator command to mitigate the estimated vibration state;
providing instructions from the vibration dampening computer to the electric linear actuator to move the horizontal stabilizer according to the actuator command determined to mitigate the estimated vibration state;
receiving the real-time vibration state measured by the plurality of accelerometers or position sensors;
determining a corrective actuator command based on the real-time vibration state; and
providing the corrective actuator command to the electric linear actuator.

20. The vibration dampening system of claim 14, wherein the active damper comprises a visco-elastic damper having a variable coefficient dampening element, and wherein the vibration dampening system further comprises:
a vibration dampening computer operative to determine a pressure command for the variable coefficient dampening element to mitigate a vibration frequency associated with the horizontal stabilizer, and to actuate a variable flow valve in a fluid accumulator circuit according to the pressure command to manage a dampening coefficient within the variable coefficient dampening element to mitigate the vibration frequency.

21. The vibration dampening system of claim 2, wherein the horizontal stabilizer is mounted in a low tail configuration within a fuselage of the aircraft.

22. The vibration dampening system of claim 2, wherein the horizontal stabilizer is mounted in a cruciform tail configuration within a vertical stabilizer of the aircraft.

23. The vibration dampening system of claim 2, wherein the horizontal stabilizer is mounted in T-Tail configuration within a top portion of a vertical stabilizer of the aircraft.

24. A method for mitigating vibration in a horizontal stabilizer of an aircraft, the method comprising:
receiving a vibration at a first damper coupled to a front portion of the horizontal stabilizer at a first location and at a second damper coupled to the horizontal stabilizer proximate to a pivot point at a second location different than the first location, wherein each of the first damper and the second damper is independently mechanically coupled to the horizontal stabilizer;
dampening the vibration in a first degree of freedom with the first damper; and
dampening the vibration in a second degree of freedom with the second damper.

25. The method of claim 24, wherein at least one of the first damper and the second damper comprises a passive damper.

26. The method of claim 25, wherein the passive damper comprises a visco-elastic damper such that dampening the vibration comprises pressing a viscous fluid with a piston to press the viscous fluid through one or more orifices in the piston and compressing a spring in response to a force from the vibration and upon release of the force, returning the piston toward a starting position with a force from the spring.

27. The method of claim 26, wherein compressing the spring comprises compressing a first spring configured for mitigating a first vibration force at a first frequency and compressing a second spring configured for mitigating a second vibration force at a second frequency.

28. The method of claim 27, wherein compressing the first spring and compressing the second spring comprises applying force with a moveable top damper wall to the first spring and the second spring concentrically arranged around a central damper member, the central damper member extending from the moveable top damper wall at one end to a damper piston in a viscous fluid chamber at the other end such that the force applied to the moveable top damper wall compresses the first spring and the second spring while being resisted upon by viscous fluid within the viscous fluid chamber with the damper piston.

29. The method of claim 24, further comprising:
receiving the vibration at a bank of parallel dampers coupled to the horizontal stabilizer proximate to the pivot point of the horizontal stabilizer, the bank of parallel dampers comprising the second damper and a third damper, wherein the second damper configured to dampen the vibrational force in the second degree of freedom at a first frequency and the third damper configured to dampen the vibrational force in the second degree of freedom at a second frequency, and
wherein dampening the vibration in the second degree of freedom with the second damper comprises dampening the vibration in the second degree of freedom with the second damper and the third damper.

30. The method of claim 24, wherein at least one of the first damper and the second damper comprises an active damper.

31. The method of claim 30, wherein the active damper comprises an electric linear actuator, and wherein the method further comprises:
determining an actuator command to mitigate a vibration frequency associated with the horizontal stabilizer; and
providing the actuator command to the electric linear actuator for execution by the electric linear actuator.

32. The method of claim 31, the method further comprising:
receiving a real-time vibration state associated with the horizontal stabilizer from a plurality of accelerometers or position sensors; and
providing the real-time vibration state to a vibration dampening computer,
wherein determining the actuator command to mitigate the vibration frequency comprises determining the actuator command to mitigate the real-time vibration state measured by the plurality of accelerometers or position sensors.

33. The method of claim 31, wherein determining the actuator command to mitigate the vibration frequency comprises:
receiving one or more aircraft parameters corresponding to a current state of the aircraft or an aircraft system;
determining an estimated vibration state associated with the horizontal stabilizer based on the one or more aircraft parameters; and
determining the actuator command to mitigate the estimated vibration state.

34. The method of claim 33, wherein the one or more aircraft parameters comprise:
one or more of an engine setting, a flight characteristic, an aircraft characteristic, a flight control setting, and an ambient parameter.

35. The method of claim 31, wherein determining the actuator command to mitigate the vibration frequency comprises:
receiving one or more aircraft parameters corresponding to a current state of the aircraft or an aircraft system;
determining an estimated vibration state associated with the horizontal stabilizer based on the one or more aircraft parameters;
determining the actuator command to mitigate the estimated vibration state;
providing instructions from the vibration dampening computer to the electric linear actuator to move the horizontal stabilizer according to the actuator command determined to mitigate the estimated vibration state;
receiving a real-time vibration state associated with the horizontal stabilizer from a plurality of accelerometers or position sensors;
determining a corrective actuator command based on the real-time vibration state; and
providing the corrective actuator command to the electric linear actuator.

36. The method of claim 30, wherein the active damper comprises a visco-elastic damper having a variable coefficient dampening element, and wherein the method further comprises:
determining a pressure command for the variable coefficient dampening element to mitigate a vibration frequency associated with the horizontal stabilizer with a vibration dampening computer; and
actuating a variable flow valve in a fluid accumulator circuit according to the pressure command to manage a dampening coefficient within the variable coefficient dampening element to mitigate the vibration frequency.

37. A vibration dampening system for a horizontal stabilizer of an aircraft, the system comprising:
a first visco-elastic damper coupled to a front portion of the horizontal stabilizer, the first visco-elastic damper configured to dampen a vibrational force in a first degree of freedom;
a second visco-elastic damper coupled to the horizontal stabilizer proximate to a first pivot point around a pitch axis of the horizontal stabilizer, the second visco-elastic damper configured to dampen the vibrational force in a second degree of freedom; and
a third visco-elastic damper coupled to the horizontal stabilizer proximate to a second pivot point around the pitch axis of the horizontal stabilizer, the third visco-elastic damper configured to dampen the vibrational force in the second degree of freedom.

38. The vibration dampening system of claim 37, wherein the first visco-elastic damper, the second visco-elastic damper, and the third visco-elastic damper are configured to mitigate vibrations within at least two different frequencies.

39. The vibration dampening system of claim 38, wherein each of the first visco-elastic damper, the second visco-elastic damper, and the third visco-elastic damper comprises a bank of parallel visco-elastic dampers, each damper of a bank corresponding to a distinct vibration frequency.

40. The vibration dampening system of claim 38, wherein each of the first visco-elastic damper, the second visco-elastic damper, and the third visco-elastic damper comprises a plurality of springs, each spring configured to mitigate vibrations within a distinct vibration frequency.

* * * * *